United States Patent [19]

Henson et al.

[11] Patent Number: 5,202,971

[45] Date of Patent: Apr. 13, 1993

[54] SYSTEM FOR FILE AND RECORD LOCKING BETWEEN NODES IN A DISTRIBUTED DATA PROCESSING ENVIRONMENT MAINTAINING ONE COPY OF EACH FILE LOCK

[75] Inventors: Larry W. Henson; Amal A. Shaheen-Gouda; Todd A. Smith, all of Austin, Tex.

[73] Assignee: International Business Machines Corporation, Armonk, N.Y.

[21] Appl. No.: 629,073

[22] Filed: Dec. 17, 1990

Related U.S. Application Data

[63] Continuation of Ser. No. 14,891, Feb. 13, 1987, abandoned.

[51] Int. Cl.[5] .............................................. G06F 12/14
[52] U.S. Cl. ................................... 395/425; 364/282.1; 364/280; 364/260.1; 364/969.2; 364/DIG. 1; 395/600
[58] Field of Search ................ 364/200, 900; 395/600, 395/425, 725

[56] References Cited

U.S. PATENT DOCUMENTS

| | | | |
|---|---|---|---|
| 4,214,304 | 7/1980 | Shimizu et al. | 364/200 |
| 4,313,161 | 1/1982 | Hardin et al. | 364/200 |
| 4,358,823 | 11/1982 | McDonald | 364/200 |
| 4,399,504 | 8/1983 | Obermarck | 364/200 |
| 4,400,771 | 8/1983 | Suzuki et al. | 364/200 |
| 4,439,830 | 3/1984 | Chueh | 364/200 |
| 4,476,528 | 10/1984 | Matsumoto | 364/200 |
| 4,480,304 | 10/1984 | Carr | 364/200 |
| 4,574,350 | 3/1986 | Starr | 364/200 |
| 4,577,272 | 3/1986 | Ballew | 364/200 |
| 4,590,468 | 5/1986 | Stieglitz | 340/825.5 |
| 4,621,321 | 4/1986 | Boebert | 364/200 |
| 4,633,392 | 12/1986 | Vincent | 364/200 |
| 4,663,748 | 5/1987 | Karbowiak | 340/825.5 |
| 4,698,752 | 10/1987 | Goldstein | 364/200 |
| 4,714,992 | 12/1987 | Gladney | 364/200 |
| 4,716,528 | 12/1987 | Crus | 364/300 |

(List continued on next page.)

OTHER PUBLICATIONS

Rifkin et al., "RFS Architectural Overview" pp. 248-259.
Sun Micro Systems "Vnodes: An Architecture for Multiple File System Types in Sun UNIX" by S. R. Kleiman.

(List continued on next page.)

Primary Examiner—Thomas C. Lee
Assistant Examiner—Eric Coleman
Attorney, Agent, or Firm—C. Lamont Whitham

[57] ABSTRACT

A conventional single node operating system is provided with a distributed file management system (DFS) with a plurality of nodes and a plurality of files. The DFS uses the UNIX operating system tree structure employing inodes (data structure containing administrative information for each file) to manage the local files and surrogate inodes (s_inode) to manage access to files existing on another node. In addition, the DFS uses a lock table to manage the lock status of files. The method which implements the DFS locking of records and files involves the following steps. If the file is a local file, then the UNIX operating system standard file locking is used. However, if a remote file is to be locked, the UNIX operating system LOCKF and FCNTL system calls are intercepted and an remote process call (RPC) DFS_LOCK_CONTROL is executed. The server node receives the remote process call and carries out the lock request. The request could entail locking a single record, a set of records or the whole file. The server then acknowledges receipt of the RPC by sending a signal while the client surrogate inode is waiting for a reply from the DFS_LOCK_CONTROL RPC. The client confirms the reception of the lock and sends an acknowledgement to the remote server. The server updates the lock table after receiving the acknowledgement from the client surrogate inode. If the server does not confirm the reception of DFS_LOCK_CONTROL's acknowledgement, then DFS_LOCK_CONTROL updates the lock table.

18 Claims, 20 Drawing Sheets

U.S. PATENT DOCUMENTS

| | | | |
|---|---|---|---|
| 4,719,569 | 1/1988 | Ludemann | 364/200 |
| 4,720,784 | 1/1988 | Radhkrishnan | 364/200 |
| 4,742,450 | 5/1988 | Duvall | 364/200 |
| 4,751,702 | 6/1988 | Beier | 371/9.1 |
| 4,805,106 | 2/1989 | Pfeifer | 364/200 |
| 4,819,159 | 4/1989 | Shipley | 364/200 |
| 4,858,116 | 8/1989 | Gillett | 364/200 |
| 4,868,866 | 9/1989 | Williams | 364/408 |
| 4,887,204 | 12/1989 | Johnson | 364/200 |

OTHER PUBLICATIONS

AT&T Information Systems "An Administrators View of Remote File Sharing" by Richard Hamilton et al.

AT&T "A Framework for Networking in System V" by David J. Olander et al., pp. 1-8.

AT&T Information Systems "File System Switch" by Tom Houghton.

Sun Microsystems, Inc., "Sun-3 Architecture", Aug. 1986, pp. 8-9, 49-57.

Bach, Maurice J., The Design of the UNIX Operating System, 1986, pp. 382-389.

Gould, Ed, "The Network File System Implemented on 4.3 BSD", pp. 294-298.

Atlas, Alan; Flinn, Perry; "Error Recovery in a Stateful Remote Filesystem", pp. 355-365.

Sun Microsystems "Overview of the Sun Network File System" by Dan Walsh et al., pp. 117-124.

Sun Microsystems "Design and Implementation of the Sun Network Filesystem" by Russel Sandberg et al., pp. 119-130.

Secure Networking in the Sun Environment by Bradley Taylor et al., pp. 28-36, Sun Microsystems, Inc.

VFS

VNODE

INODE

FILE ACCESS STRUCTURE

NODE TABLE ENTRY

SURROGATE INODE

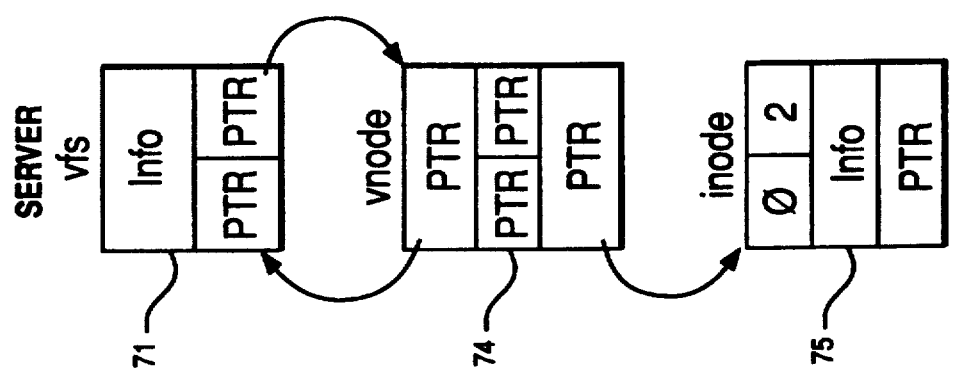
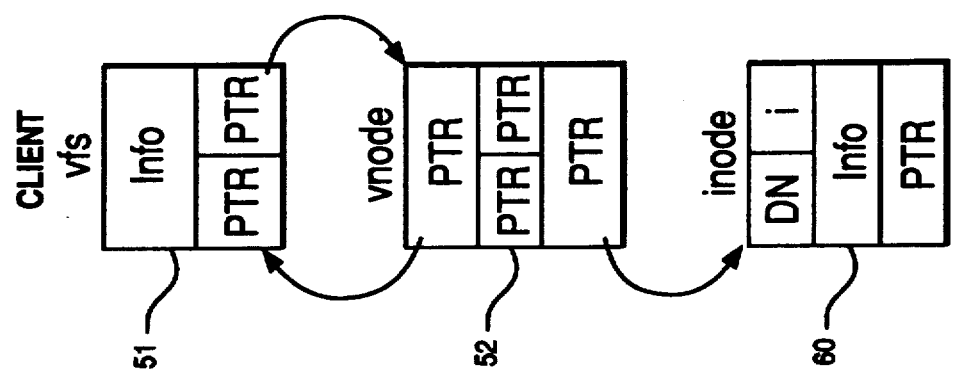
FIG. 10 flock structure filock structure

SYSTEM FOR FILE AND RECORD LOCKING BETWEEN NODES IN A DISTRIBUTED DATA PROCESSING ENVIRONMENT MAINTAINING ONE COPY OF EACH FILE LOCK

This is a continuation of Ser. No. 07/014,891, filed Feb. 13, 1987, now abandoned.

CROSS REFERENCE TO RELATED APPLICATIONS

This application is related in subject matter to the following applications filed concurrently herewith and assigned to a common assignee:

Application Ser. No. 07/014,899, now U.S. Pat. No. 4,897,781, filed by A. Chang, G. H. Neuman, A. A. Shaheen-Gouda, and T. A. Smith for A System And Method For Using Cached Data At A Local Node After Re-opening A File At A Remote Node In A Distributed Networking Environment.

Application Ser. No. 07/014,884, now abandoned filed by D. W. Johnson, L. W. Henson, A. A. Shaheen-Gouda, and T. A. Smith for Negotiating Communication Conventions Between Nodes In A Network.

Application Ser. No. 07/014,897, now U.S. Pat. No. 4,887,204, filed by D. W. Johnson, G. H. Neuman, C. H. Sauer, A. A. Shaheen-Gouda, and T. A. Smith for A System and Method For Accessing Remote Files In A Distributed Networking Environment.

Application Ser. No. 07/014,900, now U.S. Pat. No. 5,175,892, filed by D. W. Johnson, A. A. Shaheen-Gouda, T. A. Smith for Distributed File Access Structure Lock.

Application Ser. No. 07/014,892, now U.S. Pat. No. 5,001,628, filed by D. W Johnson, L. K. Loucks, C. H. Sauer, and T. A. Smith for Single System Image Uniquely Defining An Environment for Each User In A Data Processing System.

Application Ser. No. 07/014,888, now U.S. Pat. No. 5,133,053, filed by D. W. Johnson, L. K. Loucks, A. A. Shaheen-Gouda for Interprocess Communication Queue Location Transparency.

Application Ser. No. 07/014,889, now U.S. Pat. No. 5,151,989, filed by D. W. Johnson, A. A. Shaheen-Gouda, and T. A. Smith for Directory Cache Management In A Distributed Data Processing System.

The disclosures of the foregoing co-pending applications are incorporated herein by reference.

DESCRIPTION

1. Field of the Invention

This invention generally relates to improvements in operating systems for a distributed data processing system and, more particularly, to an operating system for a multi-processor system interconnected by a local area network (LAN) or a wide area network (WAN). IBM's System Network Architecture (SNA) may be used to construct the LAN or WAN. The operating system according to the invention permits the accessing of files by processors in the system, no matter where those files are located in the system. The preferred embodiment of the invention is disclosed in terms of a preferred embodiment which is implemented in a version of the UNIX[1] operating system; however, the invention could be implemented in other and different operating systems.

[1] Developed and licensed by AT&T. UNIX is a registered trademark of AT&T in the U.S.A. and other countries.

2. Background of the Invention

Virtual machine operating systems are known in the prior art which make a single real machine appear to be several machines. These machines can be very similar to the real machine on which they are run or they can be very different. While many virtual machine operating systems have been developed, perhaps the most widely used is VM/370 which runs on the IBM System/370. The VM/370 operating system creates the illusion that each of several users operating from terminals has a complete System/370 with varying amounts of disk and memory capacity.

The physical disk devices are managed by the VM/370 operating system. The physical volumes residing on disk are divided into virtual volumes of various sizes and assigned and accessed by users carrying out a process called mounting. Mounting defines and attaches physical volumes to a VM/370 operating system and defines the virtual characteristics of the volumes such as size, security and ownership.

Moreover, under VM/370 a user can access and use any of the other operating systems running under VM/370 either locally on the same processor or remotely on another processor. A user in Austin can use a function of VM/370 called "passthru" to access another VM/370 or MVS/370 operating system on the same processor or, for example, a processor connected into the same SNA network and located in Paris, France. Once the user has employed this function, the files attached to the other operating system are available for processing by the user.

There are some significant drawbacks to this approach. First, when the user employs the "passthru" function to access another operating system either locally or remotely, the files and operating environment that were previously being used are no longer available until the new session has been terminated. The only way to process files from the other session is to send the files to the other operating system and effectively make duplicate copies on both disks. Second, the user must have a separate "logon" on all the systems that are to be accessed. This provides the security necessary to protect the integrity of the system, but it also creates a tremendous burden on the user. For further background, the reader is referred to the text book by Harvey M. Deitel entitled *An Introduction to Operating Systems*, published by Addison-Wesley (1984), and in particular to Chapter 22 entitled "VM: A Virtual Machine Operating System". A more in depth discussion may be had by referring to the text book by Harold Lorin and Harvey M. Deitel entitled *Operating Systems*, published by Addison-Wesley (1981), and in particular to Chapter 16 entitled "Virtual Machines".

The invention to be described hereinafter was implemented in a version of the UNIX operating system but may be used in other operating systems having characteristics similar to the UNIX operating system. The UNIX operating system was developed by Bell Telephone Laboratories, Inc., for use on a Digital Equipment Corporation (DEC) minicomputer but has become a popular operating system for a wide range of minicomputers and, more recently, microcomputers. One reason for this popularity is that the UNIX operating system is written in the C programming language, also developed at Bell Telephone Laboratories, rather than in assembly language so that it is not processor specific. Thus, compilers written for various machines to give them C capability make it possible to transport the UNIX operating system from one machine to another. Therefore, application programs written for the UNIX operating system environment are also portable from one machine to another. For more information on the UNIX operating system, the reader is referred to *UNIX™ System, User's Manual, System V*, published by Western Electric Co., January, 1983. A good overview of the UNIX operating system is provided by Brian W. Kernighan and Rob Pike in their book entitled *The Unix Programming Environment*, published by Prentice-Hall (1984). A more detailed description of the design of the UNIX operating system is to be found in a book by Maurice J. Bach, *Design of the Unix Operating System*, published by Prentice-Hall (1986).

AT&T Bell Labs has licensed a number of parties to use the UNIX operating system, and there are now several versions available. The most current version from AT&T is version 5.2. Another version known as the Berkeley version of the UNIX operating system was developed by the University of California at Berkeley. Microsoft, the publisher of the popular MS-DOS and PC-DOS operating systems for personal computers, has a version known under their trademark as XENIX. With the announcement of the IBM RT PC[2] (RISC (reduced instruction set computer) Technology Personal Computer) in 1985, IBM Corp. released a new operating system called AIX[3] (Advanced Interactive Executive) which is compatible at the application interface level with AT&T's UNIX operating system, version 5.2, and includes extensions to the UNIX operating system, version 5.2. For more description of the AIX operating system, the reader is referred to *AIX Operating System Technical Reference*, published by IBM Corp., First Edition (November, 1985).

[2]RT and RT PC are registered trademarks of IBM Corporation.
[3]AIX is a trademark of IBM Corporation.

The invention is specifically concerned with distributed data processing systems characterized by a plurality of processors interconnected in a network. As actually implemented, the invention runs on a plurality of IBM RT PCs interconnected by IBM's Systems Network Architecture (SNA), and more specifically SNA LU 6.2 Advanced Program to Program Communication (APPC). SNA uses as its link level Ethernet[4], a local area network (LAN) developed by Xerox Corp., or SDLC (Synchronous Data Link Control). A simplified description of local area networks including the Ethernet local area network may be found in a book by Larry E. Jordan and Bruce Churchill entitled *Communications and Networking for the IBM PC*, published by Robert J. Brady (a Prentice-Hall company) (1983). A more definitive description of communications systems for computers, particularly of SNA and SDLC, is to be found in a book by R. J. Cypser entitled *Communications Architecture for Distributed Systems*, published by Addison-Wesley (1978). It will, however, be understood that the invention may be implemented using other and different computers than the IBM RT PC interconnected by other networks than the Ethernet local area network or IBM's SNA.

[4]Ethernet is a trademark of Xerox Corporation.

As mentioned, the invention to be described hereinafter is directed to a distributed data processing system in a communication network. In this environment, each processor at a node in the network potentially may access all the files in the network no matter at which nodes the files may reside. As shown in FIG. 1, a distributed network environment 1 may consist of two or more nodes A, B and C connected through a communication link or network 3. The network 3 can be a local area network (LAN) as mentioned or a wide area network (WAN), the latter comprising a switched or leased teleprocessing (TP) connection to other nodes or to a SNA network of systems. At any of the nodes A, B or C there may be a processing system 10A, 10B or 10C, such as the aforementioned IBM RT PC. Each of these systems 10A, 10B and 10C may be a single user system or a multi-user system with the ability to use the network 3 to access files located at a remote node in the network. For example, the processing system 10A at local node A is able to access the files 5B and 5C at the remote nodes B and C.

The problems encountered in accessing remote nodes can be better understood by first examining how a standalone system accesses files. In a standalone system, such as 10 shown in FIG. 2, a local buffer 12 in the operating system 11 is used to buffer the data transferred between the permanent storage 2, such as a hard file or a disk in a personal computer, and the user address space 14. The local buffer 12 in the operating system 11 is also referred to as a local cache or kernel buffer. For more information on the UNIX operating system kernel, see the aforementioned books by Kernighan et al. and Bach. The local cache can be best understood in terms of a memory resident disk. The data retains the physical characteristics that it had on disk; however, the information now resides in a medium that lends itself to faster data transfer rates very close to the rates achieved in main system memory.

In the standalone system, the kernel buffer 12 is identified by blocks 15 which are designated as device number and logical block number within the device. When a read system call 16 is issued, it is issued with a file descriptor of the file 5 and a byte range within the file 5, as shown in step 101 in FIG. 3. The operating system 11 takes this information and converts it to device number and logical block numbers of the device in step 102. Then the operating system 11 reads the cache 12 according to the device number and logical block numbers, step 103.

Any data read from the disk 2 is kept in the cache block 15 until the cache block 15 is needed. Consequently, any successive read requests from an application program 4 that is running on the processing system 10 for the same data previously read from the disk is accessed from the cache 12 and not the disk 2. Reading from the cache is less time consuming than accessing the disk; therefore, by reading from the cache, performance of the application 4 is improved. Obviously, if the data which is to be accessed is not in the cache, then a disk access must be made, but this requirement occurs infrequently.

Similarly, data written from the application 4 is not saved immediately on the disk 2 but is written to the cache 12. This again saves time, improving the performance of the application 4. Modified data blocks in the cache 12 are saved on the disk 2 periodically under the control of the operating system 11.

Use of a cache in a standalone system that utilizes the AIX operating system, which is the environment in which the invention was implemented, improves the overall performance of the system disk and minimizes access time by eliminating the need for successive read and write disk operations.

In the distributed networking environment shown in FIG. 1, there are two ways the processing system 10C in local node C could read the file 5A from node A. In one way, the processing system 10C could copy the whole file 5A and then read it as if it were a local file 5C residing at node C. Reading the file in this way creates a problem if another processing system 10B at node B, for example, modifies the file 5A after the file 5A has been copied at node C. The processing system 10C would not have access to the latest modifications to the file 5A.

Another way for processing system 10C to access a file 5A at node A is to read one block at a time as the processing system at node C requires it. A problem with this method is that every read has to go across the network communications link 3 to the node A where the file resides. Sending the data for every successive read is time consuming.

Accessing files across a network presents two competing problems as illustrated above. One problem involves the time required to transmit data across the network for successive reads and writes. On the other hand, if the file data is stored in the node to reduce network traffic, the file integrity may be lost. For example, if one of the several nodes is also writing to the file, the other nodes accessing the file may not be accessing the latest updated file that has just been written. As such, the file integrity is lost, and a node may be accessing incorrect and outdated files. The invention to be described hereinafter is part of an operating system which provides a solution to the problem of managing distributed information.

Within this document, the term "server" will be used to indicate the processing system where the file is permanently stored, and the term client will be used to mean any other processing system having processes accessing the file.

Other approaches to supporting a distributed data processing system in the UNIX operating system environment are known. For example, Sun Microsystems has released a Network File System (NFS) and Bell Laboratories has developed a Remote File System (RFS). The Sun Microsystems NFS has been described in a series of publications including S. R. Kleiman, "Vnodes: An Architecture for Multiple File System Types in Sun UNIX", *Conference Proceedings, USENIX 1986 Summer Technical Conference and Exhibition*, pp. 238 to 247; Russel Sandberg et al., "Design and Implementation of the Sun Network Filesystem", *Conference Proceedings, Usenix 1985*, pp. 119 to 130; Dan Walsh et al., "Overview of the Sun Network File System", pp. 117 to 124; JoMei Chang, "Status Monitor Provides Network Locking Service for NFS"; JoMei Chang, "SunNet", pp. 71 to 75; and Bradley Taylor, "Secure Networking in the Sun Environment", pp. 28 to 36. The AT&T RFS has also been described in a series of publications including Andrew P. Rifkin et al., "RFS Architectural Overview", *USENIX Conference Proceedings*, Atlanta, Ga. (June, 1986), pp. 1 to 12; Richard Hamilton et al., "An Administrator's View of Remote File Sharing", pp. 1 to 9; Tom Houghton et al., "File Systems Switch", pp. 1 to 2; and David J. Olander et al., "A Framework for Networking in System V", pp. 1 to 8.

One feature of the distributed services system in which the subject invention is implemented which distinguishes it from the Sun Microsystems NFS, for example, is that Sun's approach was to design what is essentially a stateless machine. More specifically, the server in a distributed system may be designed to be stateless. This means that the server does not store any information about client nodes, including such information as which client nodes have a server file open, whether client processes have a file open in read—only or read—write modes, or whether a client has locks placed on byte ranges of the file. Such an implementation simplifies the design of the server because the server does not have to deal with error recovery situations which may arise when a client fails or goes off-line without properly informing the server that it is releasing its claim on server resources.

An entirely different approach was taken in the design of the distributed services system in which the present invention is implemented. More specifically, the distributed services system may be characterized as a "statefull implementation". A "statefull" server, such as that described here, does keep information about who is using its files and how the files are being used. This requires that the server have some way to detect the loss of contact with a client so that accumulated state information about that client can be discarded. The cache management strategies described here, however, cannot be implemented unless the server keeps such state information. The management of the cache is affected, as described below, by the number of client nodes which have issued requests to open a server file and the read/write modes of those opens.

SUMMARY OF THE INVENTION

It is therefore a general object of this invention to provide a distributed services system for an operating system which supports a multi-processor data processing system interconnected in a communications network that provides user transparency as to file location in the network and as to performance.

It is another, more specific object of the invention to provide a technique for providing a distributed file and record locking capability.

According to the invention, these objects are accomplished by using the following steps to lock files. If the file is a local file, then the UNIX operating system standard file locking is used. However, if a remote file is to be locked, the UNIX operating system LOCKF and FCNTL system calls are intercepted and an remote process call (RPC) DFS_LOCK_CONTROL is executed. The server node receives the remote process call and carries out the lock request. The request could entail locking a single record, a set of records or the whole file. The server then sends the tells the client to awaken by sending a signal while the client surrogate inode is waiting for a reply from the DFS_LOCK_CONTROL RPC. The client confirms the reception of the lock and acknowledges receipt of the RPC to the remote server. The server updates the lock table after receiving the acknowledgement from the client surrogate inode. If the server does not confirm the reception of DFS_LOCK_CONTROL's acknowledgement, then DFS_LOCK_CONTROL removes the lock from the lock table.

BRIEF DESCRIPTION OF THE DRAWINGS

The foregoing and other objects, aspects and advantages of the invention will be better understood from the following detailed description of the preferred embodiment of the invention with reference to the accompanying drawings, in which:

FIG. 3 is a flowchart showing the steps performed by an operating system when a read system call is made by an application running on a processor;

FIGS. 10, 11 and 12 are block diagrams of the data structures illustrating the scenarios for a mount file operation and following a path to a file at a local and remote node in a distributed system as performed by the operating system;

DESCRIPTION OF THE PREFERRED EMBODIMENT

Figure 1:
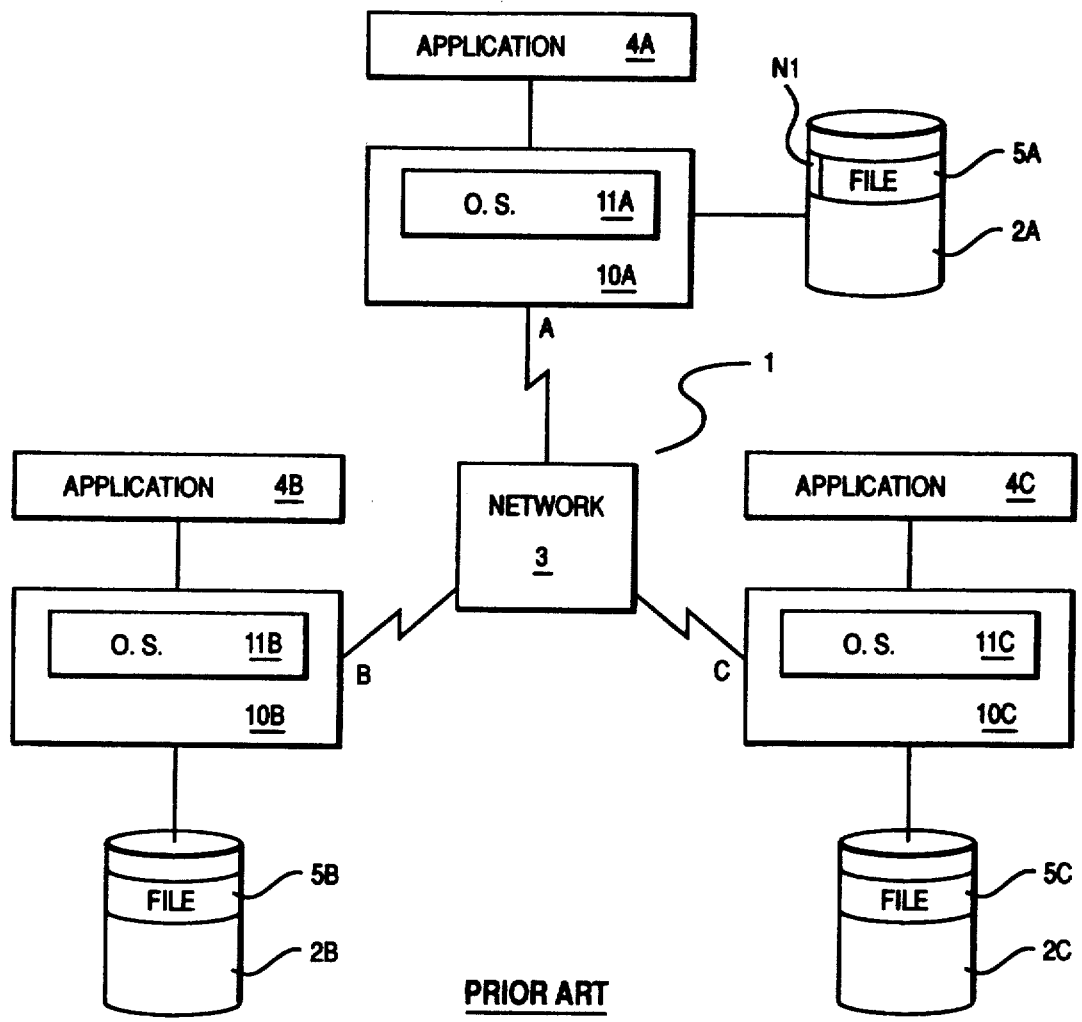
FIG. 1 is a block diagram showing a typical distributed data processing system in which the subject invention is designed to operate.

The following disclosure describes solutions to problems which are encountered when creating a distributed file system in which the logic that manages a machine's files is altered to allow files that physically reside in several different machines to appear to be part of the local machine's file system. The implementation described is an extension of the file system of the AIX operating system. Reference should be made to the above-referenced Technical Reference for more information on this operating system. Specific knowledge of the following AIX file system concepts is assumed: tree structured file systems; directories; and file system organization, including inodes.

In a UNIX operating system, an individual disk (or diskette or partition of a disk) contains a file system. The essential aspects of the file system that are relevant to this discussion are listed below:

a) each file on an individual file system is uniquely identified by its inode number;

b) directories are files, and thus a directory can be uniquely identified by its inode number;

c) a directory contains an array of entries of the following form:

name—inode number, where the inode number may be that of an individual file or that of another directory; and d) by convention, the inode number of the file system's root directory is inode number 2.

Following the path "/dir1/dir2/file" within a device's file system thus involves the following steps:

1. Read the file identified by inode number 2 (the device's root directory).
2. Search the directory for an entry with name=dir1.
3. Read the file identified by the inode number associated with dir1 (this is the next directory in the path).
4. Search the directory for an entry with name=dir2.
5. Read the file identified by the inode number associated with dir2 (this is the next directory in the path).
6. Search the directory for an entry with name=file.
7. The inode number associated with file in this directory is the inode number of the file identified by the path "/dir1/dir2/file".

The file trees which reside on individual file systems are the building blocks from which a node's aggregate file tree is built. A particular device (e.g., hard file partition) is designated as the device which contains a node's root file system. The file tree which resides on another device can be added to the node's file tree by performing a mount operation. The two principal parameters to the mount operation are (1) the name of the device which holds the file to be mounted and (2) the path to the directory upon which the device's file tree is to be mounted. This directory must already be part of the node's file tree; i.e., it must be a directory in the root file system, or it must be a directory in a file system which has already been added (via a mount operation) to the node's file tree.

After the mount has been accomplished, paths which would ordinarily flow through the "mounted over" directory instead flow through the root inode of the mounted file system. A mount operation proceeds as follows:

1. Follow the path to the mount point and get the inode number and device number of the directory which is to be covered by the mounted device.
2. Create a data structure which contains essentially the following:
   a) the device name and inode number of the covered directory; and
   b) the device name of the mounted device.

The path following in the node's aggregate file tree consists of (a) following the path in a device file tree until encountering an inode which has been mounted over (or, of course, the end of the path); (b) once a mount point is encountered, using the mount data structure to determine which device is next in the path; and (c) begin following the path at inode 2 (the root inode) in the device indicated in the mount structure.

The mount data structures are volatile; they are not recorded on disk. The list of desired mounts must be re-issued each time the machine is powered up as part of the Initial Program Load (IPL). The preceding discussion describes how traditional UNIX operating systems use mounts of entire file systems to create file trees and how paths are followed in such a file tree. Such an implementation is restricted to mounting the entire file system which resides on a device. The invention described herein is based on an enhancement, embodying the concept of a virtual file system, which allows (1) mounting a portion of the file system which resides on a device by allowing the mounting of directories in addition to allowing mounting of devices, (2) mounting either remote or local directories over directories which are already part of the file tree, and (3) mounting of files (remote or local) over files which are already part of the file tree.

In the virtual file system, the operations which are performed on a particular device file system are clearly separated from those operations which deal with constructing and using the node's aggregate file tree. A node's virtual file system allows access to both local and remote files.

The management of local files is a simpler problem than management of remote files. For this reason, the discussion of the virtual file system is broken into two parts. The first part describes only local operations. This part provides a base from which to discuss remote operations. The same data structures and operations are used for both remote and local operations. The discussion on local operations describes those aspects of the data and procedures which are relevant to standalone operations. The discussion on remote operations adds information pertinent to remote operations without, however, reiterating what was discussed in the local operations section.

Figure 4:
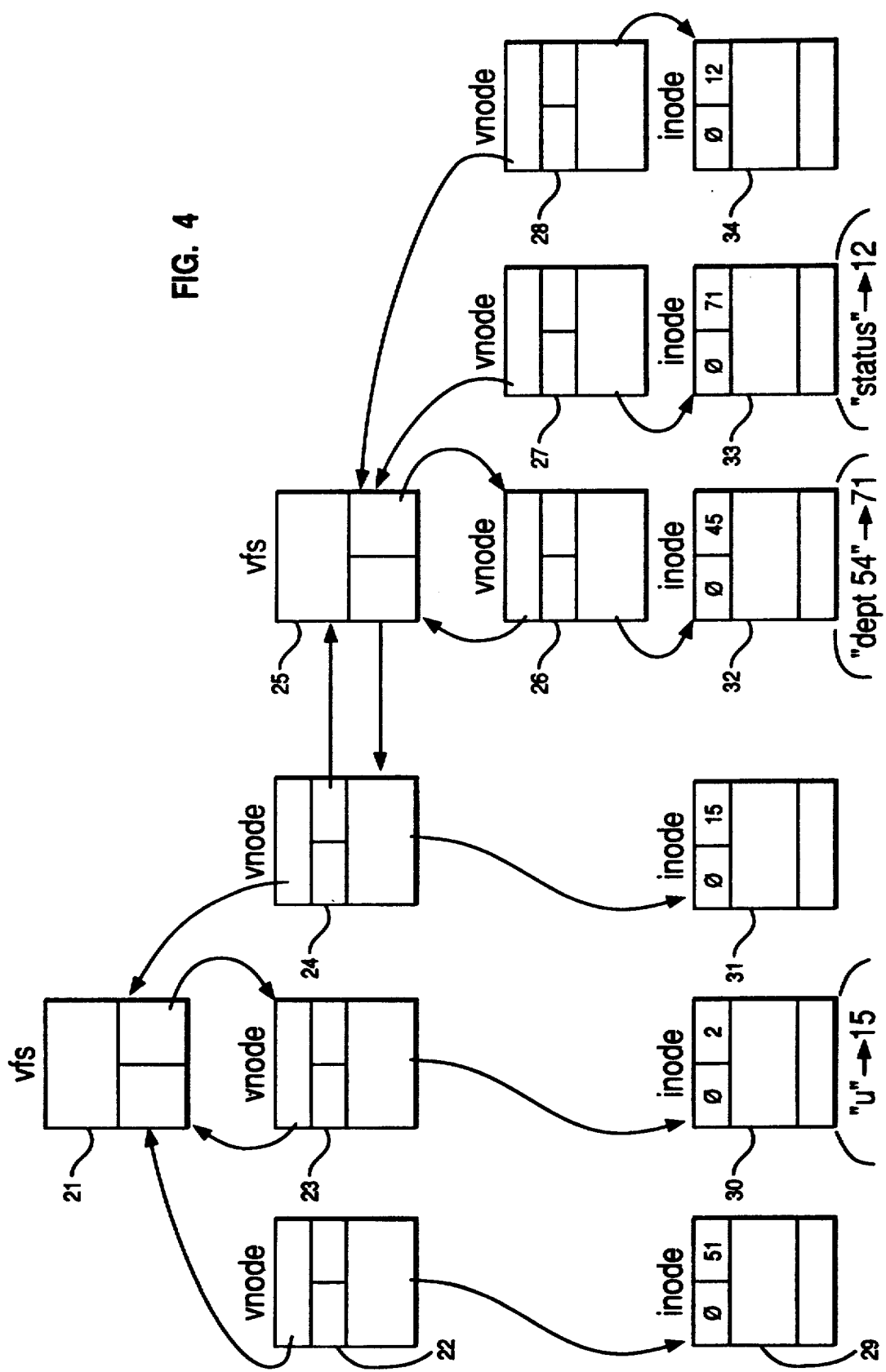
FIG. 4 is a block diagram of the data structure illustrating the scenario for following a path to a file operation at a local node as performed by the operating system which supports the subject invention.

FIG. 4 shows the relationship that exists among the data structures of the virtual file system. Every mount operation creates a new virtual file system (vfs) data structure. The essential elements in this structure are (a) a pointer to the root vnode (virtual node) of this virtual file system (e.g., the arrow from block 21 to block 23), and (b) a pointer to the vnode which was mounted over when this virtual file system was created (e.g., the arrow from block 25 to block 24).

Whenever an inode needs to be represented in the file system independent portion of the system, it is represented by a vnode. The essential elements in this structure are the following:

a) a pointer to the vfs which contains the vnode (e.g., the arrow from block 22 to block 21);

b) a pointer to the vfs which is mounted over this vnode (e.g., the arrow from block 24 to block 25; but note however that not all vnodes are the mount point for a virtual file system, i.e., a null pointer indicates that this vnode is not a mount point);

c) a pointer to either a surrogate inode or a real inode (e.g., the arrow from block 26 to block 32); and d) a pointer to a node table entry (this is a non-null only when the file is a remote file).

The AIX operating system, in common with other UNIX operating system based operating systems, keeps a memory resident table which contains information about each inode that is being used by the system. For instance, when a file is opened, its inode is read from the disk and a subset of this inode information, together with some additional information, is stored in the inode table. The essential elements of an inode table entry are (a) a pointer to the head of a file access structure list and (b) information from the disk inode, the details of which are not relevant here.

The file access structure records information about which nodes have the file open, and about the modes (read_only or read_write) of the opens. There is a separate file access structure for each node which has the file open. This state information enables the server to know how each client is using the server file.

The file system supports a set of operations which may be performed on it. A process interacts with a file system by performing a file system operation as follows:

1. The user calls one of the operations providing (perhaps) some input parameters.

2. The file system logic performs the operation, which may alter the internal data state of the file system.

3. The file system logic returns to the calling user, perhaps returning some return parameters.

The operations which can be performed on a file system are referred to as "vn_operations" or "vn_ops". There are several vn_ops, but the ones which are important to this discussion are described below:

VN_LOOKUP

In the vn_lookup operation, the essential iterative step in following a path in a file system is to locate the name of a path component in a directory file and use the associated inode number to locate the next directory in the chain. The pseudo code for the vn_lookup operation is listed below:

```
function lookup
input: directory vnode pointer,
       name to be looked up in directory
output: vnode pointer to named file/dir.
   convert directory vnode pointer
      to an inode pointer;
         — use private data pointer of vnode
   lock directory's inode;
   if( we don't have search permission in
         directory )
      unlock directory inode;
      return error;
   search directory for name;
   if( found )
      create file handle for name;
         — use inode found in directory entry;
      get pointer to vnode for file handle;
      unlock directory inode;
      return pointer to vnode;
   else — not found
      unlock directory inode;
      return error;
               VN_OPEN
```

The function vn_open creates a file access structure (or modifies an existing one) to record what open modes (READ/WRITE or READ_ONLY) to open a file. The pseudo code for the vn_open operation is listed below:

```
function vn_open
inputs: vnode pointer for file to be opened
        open flags (e.g., read-only,
           read/write)
        create mode — file mode bits if
           creating
output: return code indicating success or
        failure
```

-continued

```
    get pointer to file's inode from vnode;
    lock inode;
    if( not permitted access )
        unlock inode;
        return( error );
    get the file access structure for this
        client;
        — if there is no file access structure
            allocate one
    if( couldn't allocate file access
            structure )
        unlock inode;
        return( error );
    update file access structure read-only,
        read/write, and text counts;
    if( truncate mode is set )
        truncate file;
    unlock the inode;
                LOOKUPPN
```

The lookuppn operation is the function which follows paths. Its input is a path (e.g., "/dir1/dir2/file"), and its return is a pointer to the vnode which represents the file. Lookuppn calls vn_lookup to read one directory, then it checks to see if the vnode returned by vn_lookup has been mounted over. If the vnode is not mounted over, then lookuppn calls vn_lookup in the same file system. If the vnode has been mounted over, then lookuppn follows the pointer from the mounted over vnode (e.g. block 24 in FIG. 4) to the vfs of the mounted file system (e.g., block 25 in FIG. 4). From the vfs, it follows the pointer to the root vnode (e.g., block 26 in FIG. 4) and issues a new vn_lookup giving as input the vfs's root vnode and the name which constitutes the next element in the path. The pseudo code for the lookuppn function is listed below:

```
function lookuppn
input: pathname
output: pointer to vnode for named file
    if( first character of path is '/' )
        current vnode for search is user's root
            directory vnode;
    else
        current vnode for search is user's
            current directory vnode;
    repeat
        if( next component of path is ".." )
            while( current vnode is root of a
                    virtual file system )
                current vnode becomes the vnode that
                    the virtual file system is mounted
                    over;
                if( there is not mounted over vnode )
                    return( error ); — ".." past root
                        of file system
        use vn_lookup to look up path component
            in current vnode;
        if( vn_lookup found component );
            current vnode becomes the vnode
                returned by vn_lookup;
            while( current vnode is mounted over )
                follow current vnode's pointer to vfs
                    structure that represents the
                    mounted virtual file system;
                current vnode becomes root vnode of
                    the mounted vfs;
        else — vn_lookup couldn't file component
            return( error ); — search failed
    until( there are no additional path
            components );
    return( current vnode );
```

The operation will be illustrated by describing the scenarios of following a path to a file and mounting a directory. First, in following a path to a file, suppose an application process issues a system call (e.g., open) for file "/u/dept54/status". This request is accomplished by the operating system in the following manner with reference to FIG. 4 (operations which are basically unchanged from the UNIX operating system are not explained here in any detail). The following assumptions are made: First, the vfs represented by block 21 is the root virtual file system. Second, the file "/u" is represented by vnode block 24 and inode block 31. Third, a previous mount operation has mounted a device's file system onto the directory "/u". This mount created the vfs represented by block 25. Fourth, all of the directories and files involved are on the same device. Fifth, the following directory entries exist in the indicated directories:

| DIRECTORY INODE NUMBER | NAME | INODE NUMBER |
|---|---|---|
| 2 | "u" | 15 |
| 45 | "dept54" | 71 |
| 71 | "status" | 12 |

The code which implements the system call calls lookuppn to follow the path. Lookuppn starts at the root vnode (block 23) of the root virtual file system (block 21) and calls vn_lookup to look up the name "u" in the directory file represented by this vnode. Vn_lookup finds in the directory that the name "u" is associated with inode 15 in block 31. Vn_lookup must return a pointer to a vnode associated with inode 15. To do this it first brings inode 15 into the inode table. Then it checks to see if there is already a vnode in the parent vfs (the input vnode (block 23) has a pointer to the parent vfs) for this vnode. In this case there is. Vn_lookup then finds the vnode (block 24) in the root vfs (block 21) and returns a pointer to the vnode. Lookuppn discovers that the returned vnode is mounted over in the parent vfs. It follows the "mounted over" pointer from the vnode (block 24) to the mounted vfs (block 25). Lookuppn follows the "root vnode" pointer to the root vnode (block 26) of the new vfs (block 25). Lookuppn now calls vn_lookup again, this time inputting a pointer to the root vnode (block 26) and name "dept54". As before, vn_lookup reads the directory, finds the inode associated with the name, finds or creates a vnode for this inode in the parent vfs (block 25) and returns a pointer to this vnode. Lookuppn calls vn_lookup once more inputting the vnode for the just found directory and the name "status". Vn_lookup reads the directory, finds the inode associated with the name (block 34), finds or creates a vnode (block 28) for this inode in the parent vfs (block 25) and returns a pointer to this vnode. The code which implements the system call now performs the requested operation on the file.

Suppose now that an application process issues a "mount" system call to mount the directory "/u/gorp" over the directory "/u/foo". The following scenario explains how this request is accomplished by the operating system (again, operations which are basically unchanged from UNIX operating system are not explained in any detail).

Figure 6:
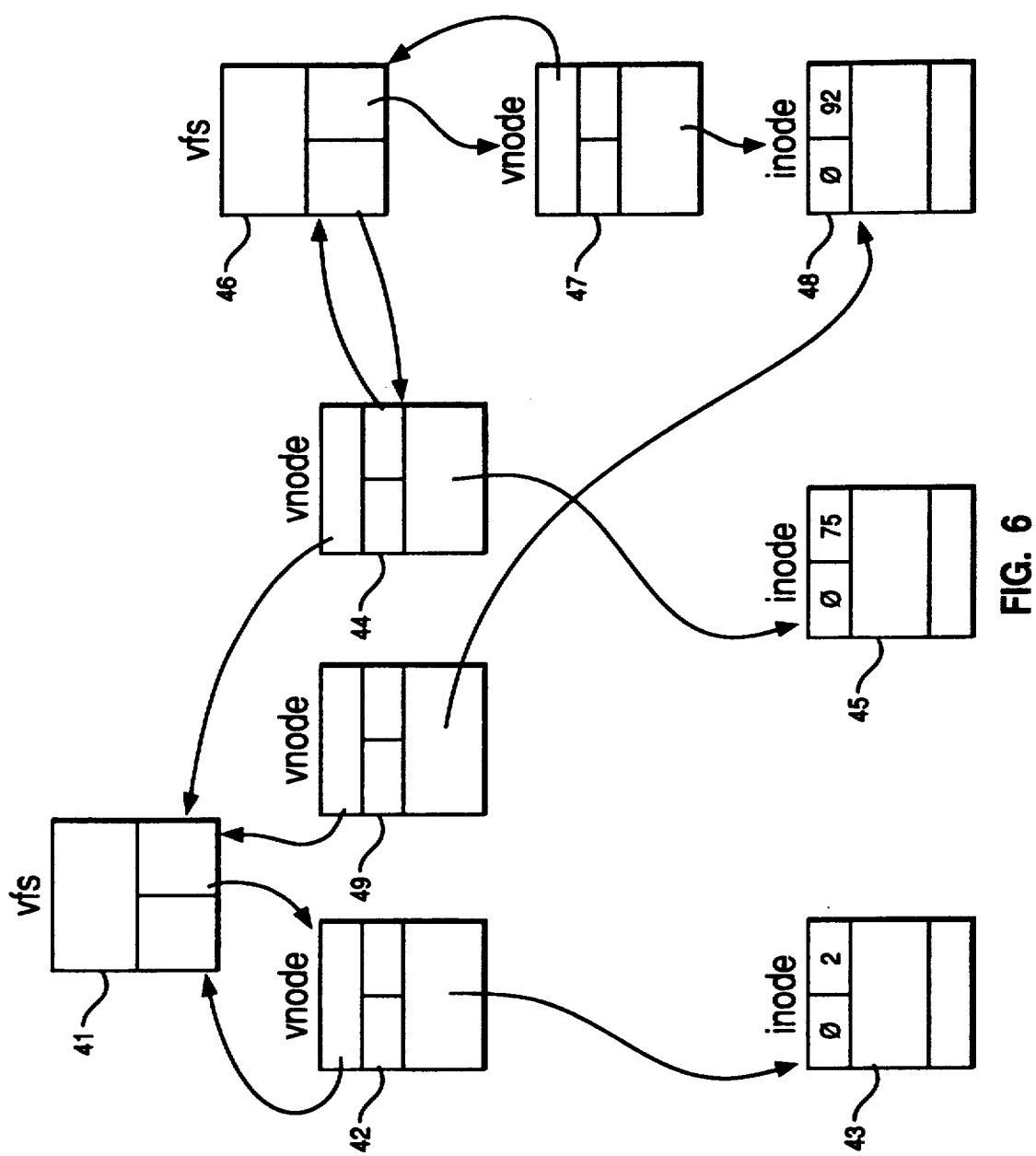
FIGS. 5 and 6 are block diagrams of the data structures illustrating the before and after conditions of the scenario for a mount file operation at a local node as performed by the operating system.
Figure 5:
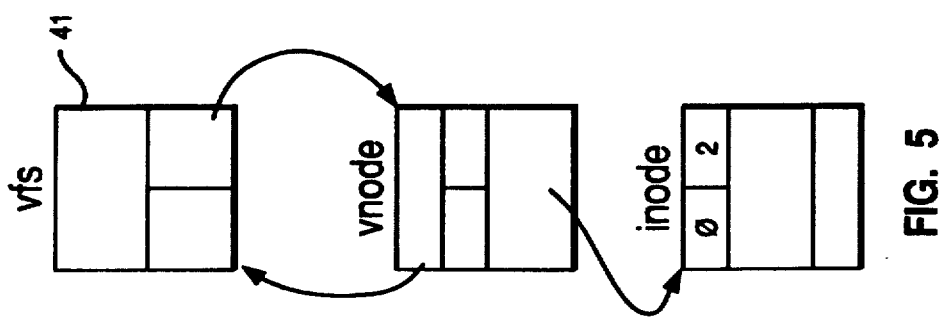

This scenario refers to FIG. 5, which represents initial conditions, and FIG. 6, which represents the final conditions, with the following assumptions: First, the vfs represented by block 41 is the root virtual file system. Second, all of the directories and files involved are on the same device. Third, the following directory entries exist in the indicated directories:

| DIRECTORY INODE NUMBER | NAME | INODE NUMBER |
| --- | --- | --- |
| 2 | "u" | 15 |
| 2 | "etc" | 83 |
| 15 | "gorp" | 92 |
| 83 | "foo" | 75 |
| 75 | "file1" | 89 |

The code which implements the mount system call performs the following operations. Lookuppn is called to follow the path to the directory which is to be mounted over—"/etc/foo". At the completion of this operation, the root vfs (block 41) contains a vnode for "/etc/foo" (block 44) which has a pointer to the root vfs (block 41) and pointer to an inode table entry (block 45) for inode 75. Lookuppn is called to follow a path to the directory which is to be mounted —"/etc/gorp". At the completion of this operation, the root vfs (block 41) contains a vnode for "/etc/gorp" (block 49) which has a pointer to the root vfs (block 41) and a pointer to an inode table entry (block 48) for inode 92. Now the mount logic creates the new virtual file system by first creating a new vfs (block 46) and then creating a root vnode for this vfs (block 47) with a pointer back to its parent vfs (block 46) and a pointer to the root inode (inode 92, block 48) of the vfs. A "mounted over" pointer is installed in the covered vnode (block 44) in the root vfs (block 41), and a pointer to the vnode upon which it is mounted (block 44) is installed in the new vfs.

Figure 7:
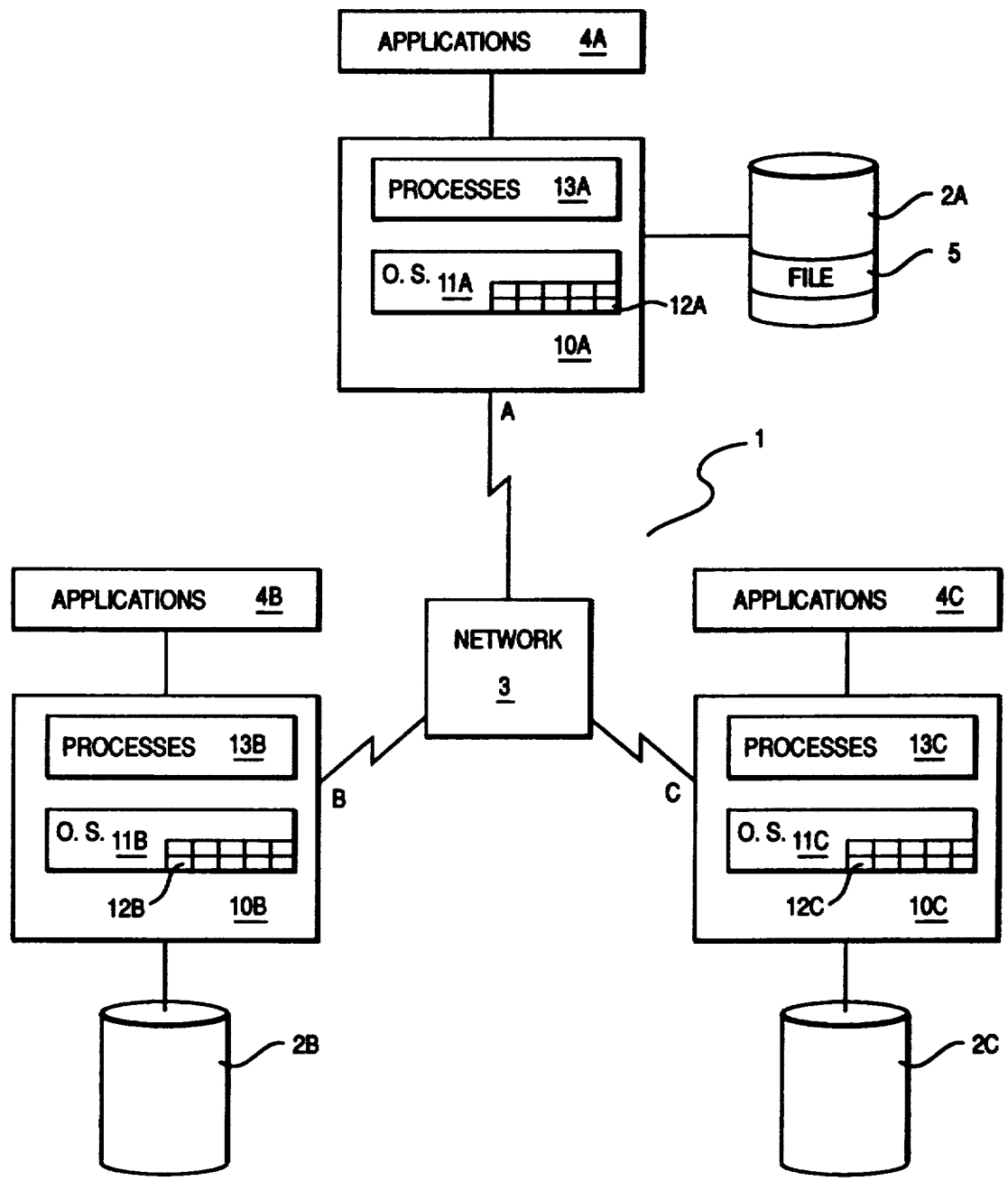
FIG. 7 is a block diagram, similar to FIG. 1, showing a distributed data processing system according to the invention.

The foregoing illustrates the data structure for standalone operation. Reference is now made to FIG. 7 which shows a distributed system similar to that shown in FIG. 1 in which the operating system which supports the present invention has been implemented. In the following description, the term "server" is used to indicate the node where a file is permanently stored, and the term "client" is used to mean any other node having processes accessing the file. It is to be understood, however, that the term "server" does not mean a dedicated server as that term is used in some local area network systems. The distributed services system in which the invention is implemented is a truly distributed system supporting a wide variety of applications running at different nodes in the system which may access files located anywhere in the system.

Figure 8:
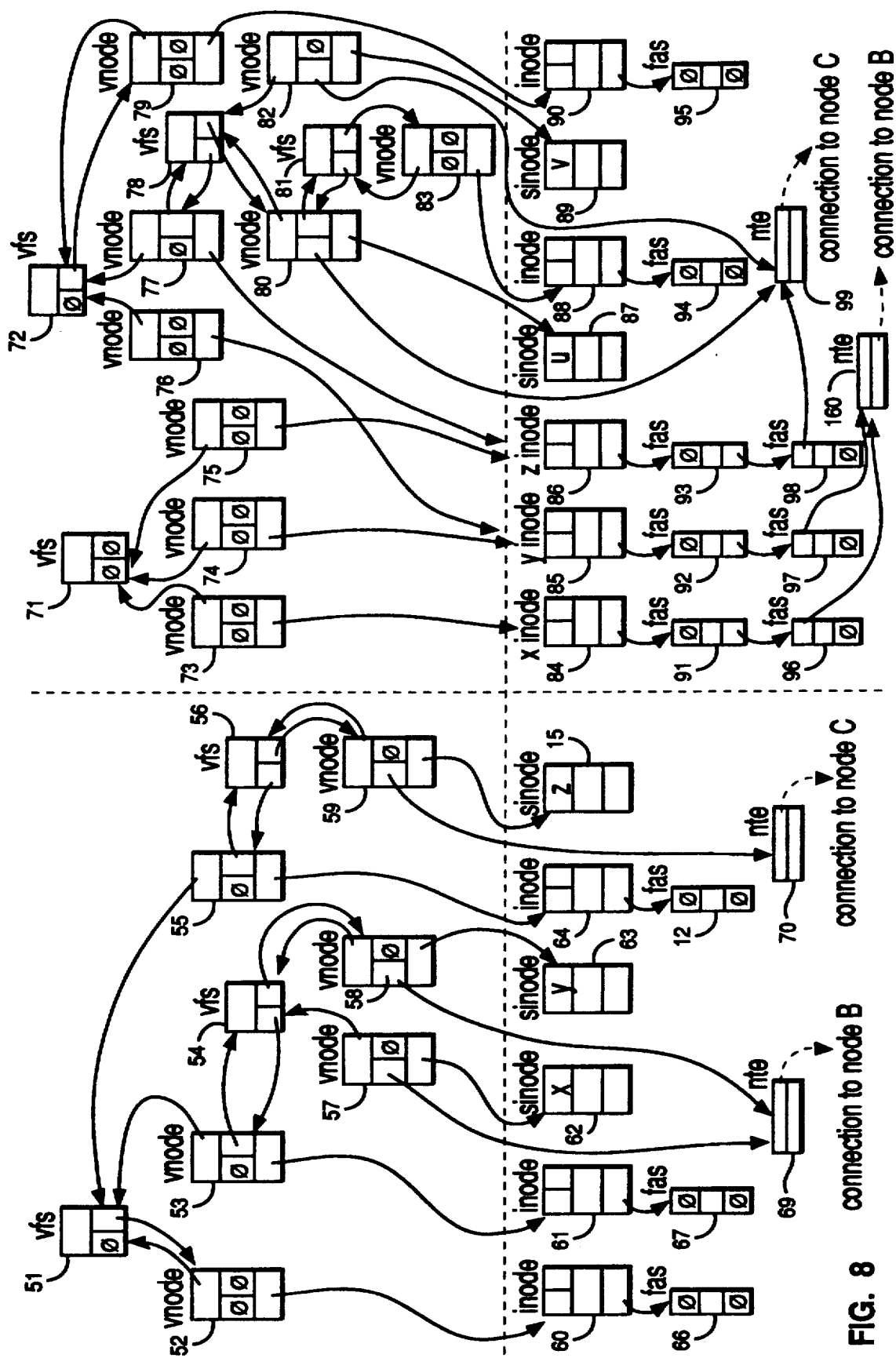
FIG. 8 is a block diagram of the data structure for the distributed file system shown in FIG. 7.
Figure 9A:
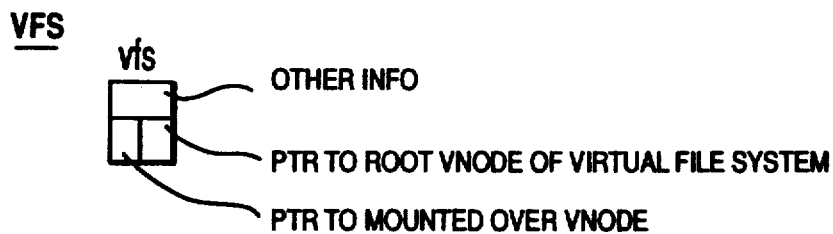
FIGS. 9A, 9B, 9C, 9D, 9E and 9F are block diagrams of component parts of the data structure shown in FIG. 8.
Figure 9B:
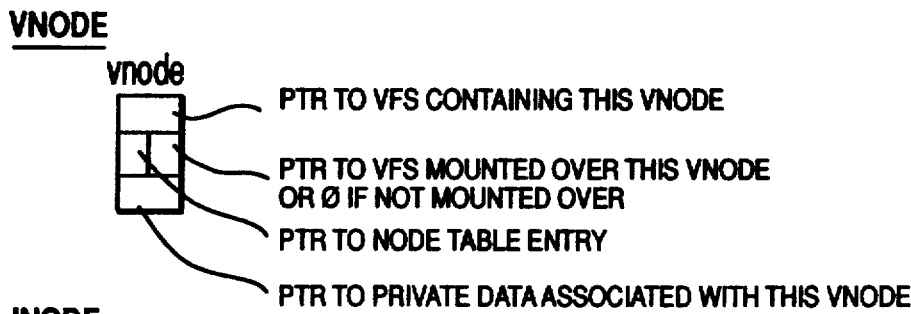
Figure 9C:
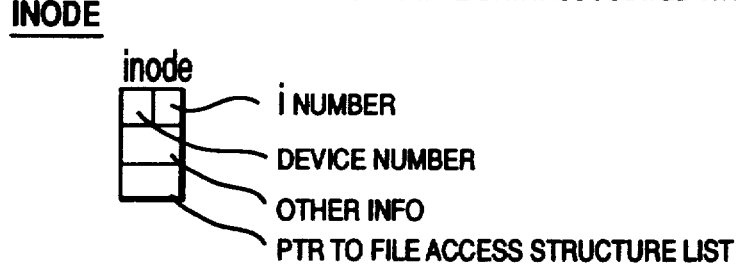
Figure 9D:
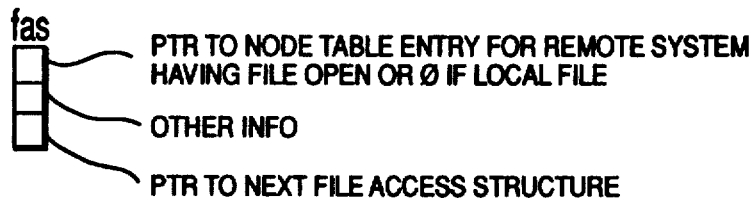
Figure 9E:
Figure 9F:
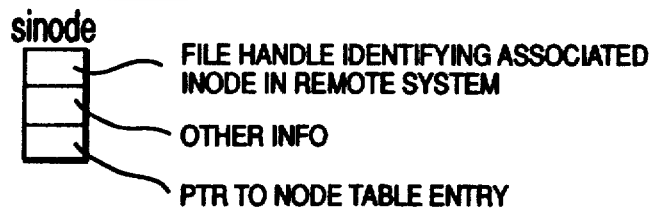

The data structure for the distributed system shown in FIG. 7 is illustrated in FIG. 8, and the component parts of that data structure are shown in FIGS. 9A to 9F. With reference to FIG. 8, a client node may have access to files which reside in a remote server node. Such a client gains access to a server's files by mounting one of the server's directories. In the client node, the data structures created by a remote mount operation compare to those created by mounting a local entity in the following ways: Just as in the local case, a remote mount creates a vfs in the client node (e.g., block 54). Just as in the local case, use of a file in a virtual file system which contains remote files creates a vnode structure in the client node (e.g., block 57). Just as in the local case, the vnode structure has a pointer to a inode table entry (e.g., block 63). The inode table entry, however, does not contain the inode information from the remote file. Instead, the inode table entry contains a surrogate inode. This surrogate inode stands for, or represents, the remote inode.

In the server node, some data structures are constructed to allow the server to record state information about how remote nodes are using its files. More specifically, each server has a "dummy vfs" (e.g., block 71) to provide a vfs to hold files open by remote clients. A server has only one dummy vfs, and all files open by all remote clients reside in this vfs. The dummy vfs is not a part of the server's file tree. For each file which is open by a remote node, there is a vnode (e.g., block 74) in the server's dummy vfs. Each file which is open by a remote node has an inode table entry in the server's inode table (e.g., block 85). This inode table entry is the same as that which exists because a local process at the server has a file open. For example, block 84, which is in the table because of a remote open, has the same structure as block 88, which is in the table because of an operation at the server.

When a client and server communicate about a server file, they need a way to identify the file. This is done with a file handle. When a client request causes the server to reply with a designation of a particular file (e.g., a remote lookup request), the file is identified by a file handle. When a client request carries a designation of a particular file (e.g., a remote open request), the file is identified by a file handle. The file handle contains the following fields: device number, inode number, and inode generation number.

The need for a file handle is illustrated by the following scenario. Suppose a client makes a request of a server and gets a file handle in reply. The client stores and remembers the file handle. Some activity at the server causes the file to be deleted and the inode slot reused for another file. The client makes a request of the server using the stored file handle. The server receives the file handle and performs the operation on the new file. This would be an unacceptable operation.

This flaw is prevented by use of the inode generation number. The inode generation number is stored on disk as a field in the inode. When the server deletes a file, it increments the inode generation number. If a request arrives at a server, the file handle is broken apart, the device number and inode number are used to locate the inode, and then the file handle inode generation number is compared to the inode's inode generation number. If they are different, then the request is rejected.

When a client wants to open a file which resides on a remote server, it uses a network transport mechanism to establish a connection with the server. Subsequent transactions regarding this file (e.g., read, write, etc.) flow on this connection. Each node contains a node table. A node uses entries in its node table (e.g., block 70) to record information about existing connections to remote nodes.

There are a limited number of operations that one node in the network can request another node to perform on its behalf. These operations are called dfs_ops. When a node makes a request of another node, the following operations occur: First, the requesting node sends a message which specifies which dfs_operation is being requested and carries the parameters appropriate to that request. Next, the receiving node receives the request and performs the specified operation. Finally, the receiving node sends a message which carries the reply parameters appropriate for the dfs_operation.

There is a close correlation between the vn_ops that are issued within a local node to a file system and the dfs_ops that are issued over the network. A typical operation on a remote file is as follows: First, a local kernel issues a vn_op, not knowing whether the file being operated on is remote or local. Second, since the file resides in a remote node, the file system implementation code sends the corresponding dfs_op to the node which holds the file. Note that if the file had been a local file, the operation would have been performed, the return parameters would have been returned, and the task would have been complete. Third, the node which holds the file receives the dfs_operation request and requests its local file system to perform the corresponding vn_operation. The return parameters from this vn_op are used to construct the return parameters for the dfs_op. Fourth, the requesting node receives the dfs_op reply from the server node and uses the dfs_op return parameters to construct the return parameters to the original vn_operation request.

Figure 11:
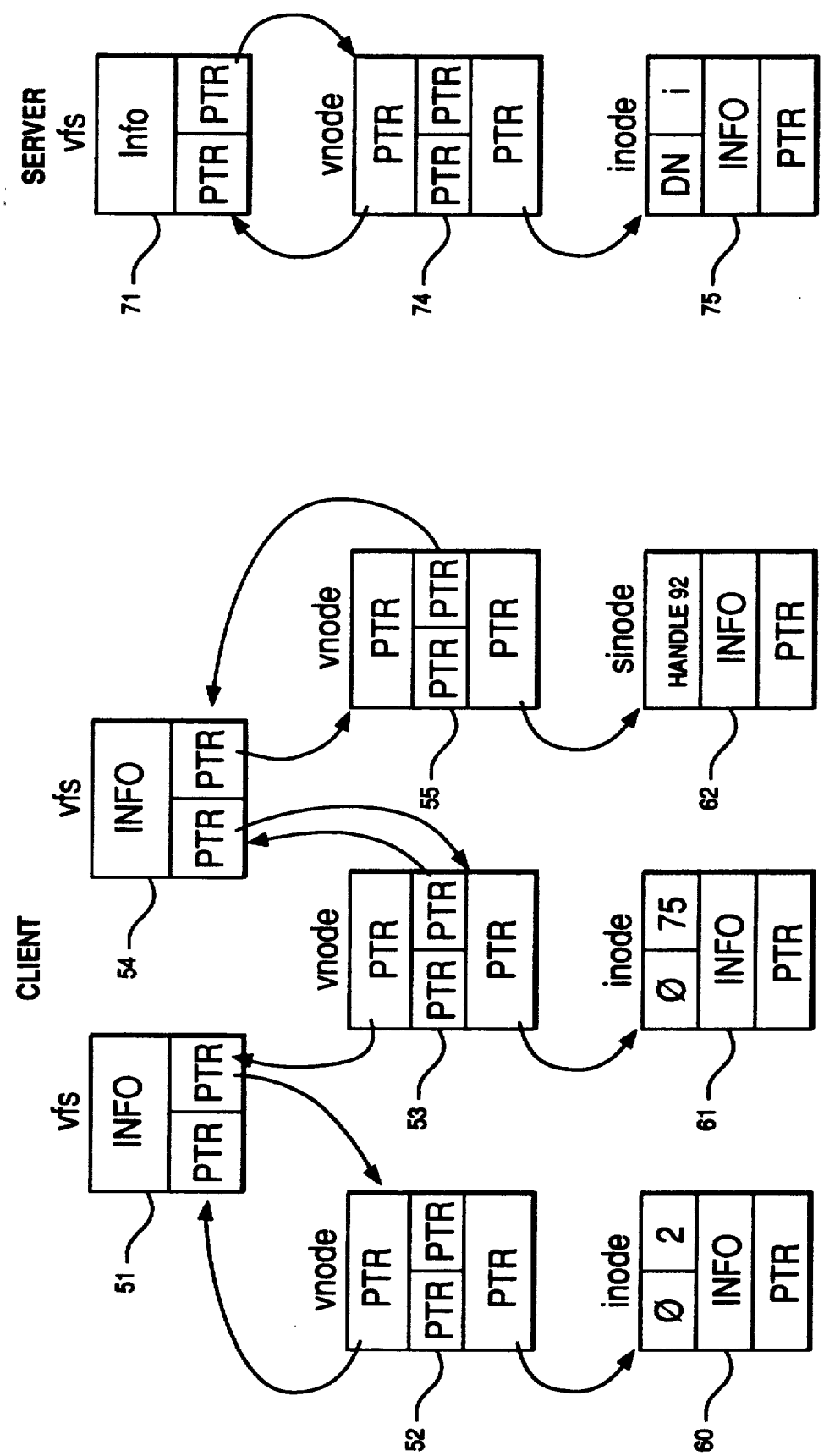

The operation will be illustrated by describing the scenarios of mounting a remote directory over a local directory and following a path to a file. In the first scenario, suppose that an application process in a client node issues a "mount" system call to mount a server node's directory "/u/gorp" over the local client directory "/etc/foo". The following scenario explains how this request is accomplished. This scenario refers to FIG. 10, which represents the initial conditions, and to FIG. 11, which represents the final condition, with the following assumptions: The vfs represented by block 51 is the root virtual file system of the server's file tree, and all the server directories and files involved are on the same device. The following entries exist in the indicated directories:

| Server Node DIRECTORY INODE NUMBER | NAME | INODE NUMBER |
| --- | --- | --- |
| 2 | "u" | 15 |
| 15 | "gorp" | 92 |
| 92 | "file2" | 67 |

| Client Node DIRECTORY INODE NUMBER | NAME | INODE NUMBER |
| --- | --- | --- |
| 2 | "etc" | 83 |
| 83 | "foo" | 75 |

The code which implements the mount system calls lookuppn to follow the path to the directory which is to be mounted over—"/etc/foo". At the completion of this operation, the root vfs (block 51) contains a vnode for "/etc/foo" (block 53) which has a pointer to the root vfs (block 51) and a pointer to an inode table entry (block 61) for inode 75. Since the directory being mounted resides in a remote node, a dfs_mount request is issued to the server node, passing the path "/u/gorp" as the path to the object to be mounted. Upon receiving the dfs_mount request, the server node calls lookuppn to follow the path to the directory which is to be mounted—"/u/gorp". At the completion of this lookup operation, the server's root vfs (block 71) contains a vnode for "/u/gorp" which has a pointer to the root vfs and pointer to an inode table entry for inode 92. The server uses the information in the inode (device 0, inode 92) to construct a file handle for the file "/u/gorp". The server returns this file handle in the reply to the dfs_mount request and then releases the vnode and inode. Finally, the client receives the file handle in the reply to the dfs_mount request and performs the operations necessary to create the new virtual file system as follows:

a) Create a new vfs (block 54).

b) Create a root vnode for this vfs (block 55) with a pointer back to its parent vfs (block 54) and a pointer to the root inode of the vfs (block 62). Since the root inode of this vfs is a remote directory, the inode pointed to from the root vnode is a surrogate inode. This surrogate inode contains the file handle returned by the server in response to the client's dfs_mount request.

c) Install a "mounted over" pointer in the covered vnode (block 53) in the root vfs (block 51).

d) Install in the new vfs (block 54) a pointer to the vnode upon which it is mounted (block 53).

Figure 12:
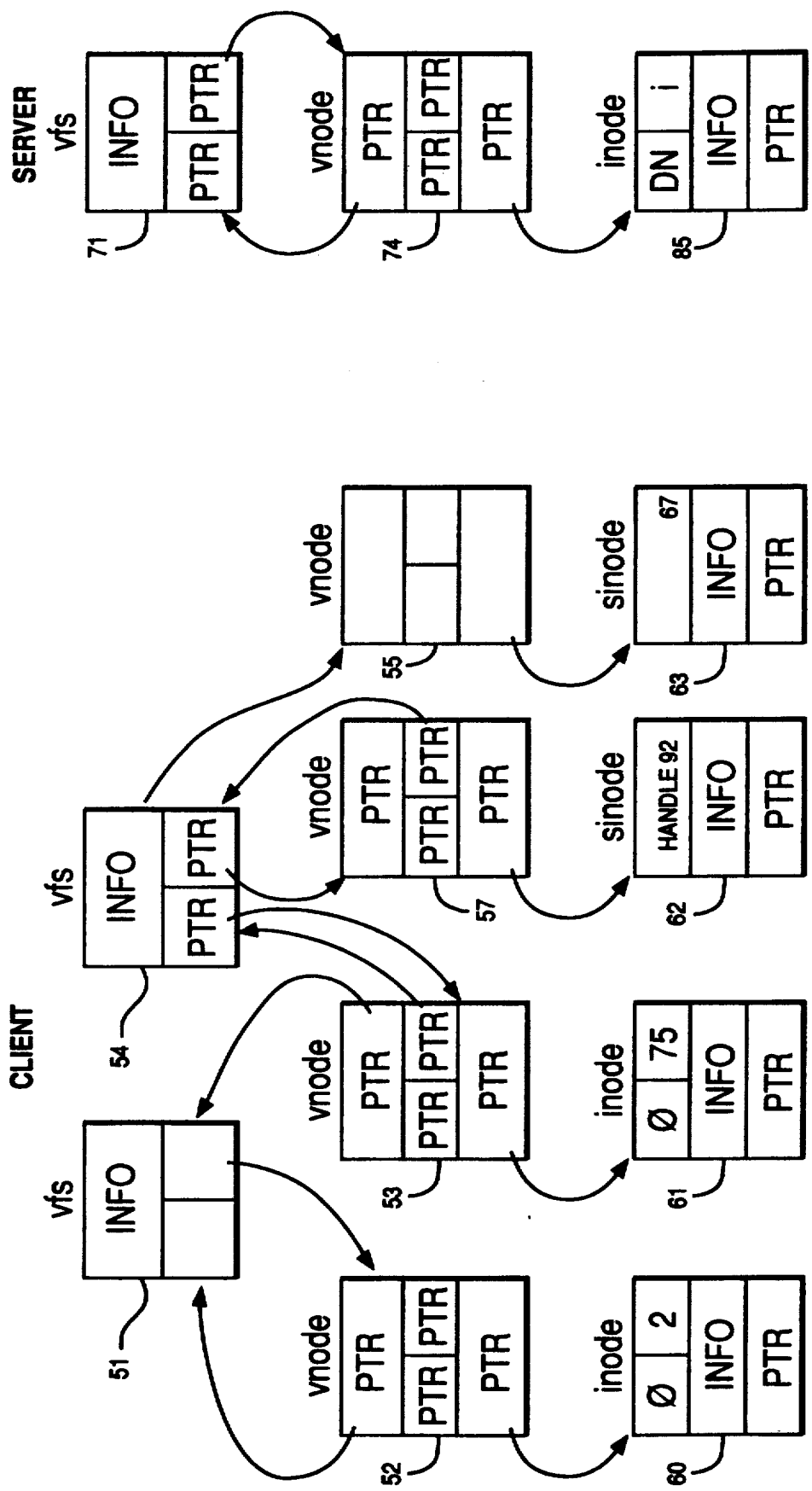

Suppose now that after executing the remote mount described above (mount server /u/gorp over client /etc/foo) a client process issues a system call to operate on the file "/etc/foo/file2". The block numbers in the following scenario refer to FIG. 11, which represents initial conditions, and FIG. 12, which represents the system state after the open operation. First, the code which implements the system call calls lookuppn to follow the path. Lookuppn starts at the root vnode (block 52) of the root virtual file system (block 51) and calls vn_lookup to look up the name "u" in the directory file represented by this vnode. Vn_lookup finds in the directory that the name "u" is associated with inode 15. Vn_lookup constructs a vnode and inode in the root virtual file system for inode 15 and returns to lookuppn a pointer to this vnode. Lookuppn calls vn_lookup again, this time to look up the name "foo" in the directory identified by inode 15. Vn_lookup reads the indicated directory and discovers that the name "foo" is associated with inode 75 in block 61. There already exists in the root vfs (block 51) a vnode (block 53) for this inode (block 61), so vn_lookup returns a pointer to this vnode. Lookuppn discovers that the vnode is mounted over (the "mounted over" pointer in block 53 points to block 54). Lookuppn thus follows the "mounted over" pointer to the next vfs (block 54) and follows its root vnode pointer to the root vnode (block 55) of the virtual file system. Lookuppn now calls vn_lookup for the next element ("file2") of the path giving vn_lookup a pointer to block 55 and the name "file2". The directory to be searched resides in a remote node and is identified by the file handle stored in the client surrogate inode (block 62). Vn_lookup issues a dfs_lookup to the server which holds the file, sending the file handle which identifies the directory and the name ("file2") which is to be looked up. When the server receives the dfs_lookup, it uses the file handle to identify the directory to be read and issues a vn_lookup to search for the name "file2" in this directory. Vn_lookup reads the directory and discovers that the inode number associated with the name "file2" is 67. Vn_lookup constructs a vnode and inode in the dummy virtual file system for inode 67 and returns to lookuppn a pointer to this vnode. Dfs_lookup uses the information in data structures returned by vn_lookup to construct a file handle for the file identified by inode 67. It returns this file handle to the client, as the reply to the dfs_lookup request, and releases the vnode and inode. In the client, a vnode (block 58) and surrogate inode (block 63) are created for the found file. Since "file2" is the last piece of the path, lookuppn returns to its caller a pointer to the found vnode (block 58). The code which implements the system call now performs the requested operation on the file.

In the distributed services system in which the invention is implemented as shown in FIG. 7, a local cache 12A, 12B and 12C exists at every node A, B and C. If file 5 permanently resides at node A on disk 2A, use of the cache 12A by local processes 13A executing at the server node A is the same as that in a stand alone system as discussed above. However, remote processes 13B and 13C executing at nodes B and C, respectively, access file 5 through a two step caching scheme using a server cache and a client cache as shown in FIG. 3. The server node gets blocks of file 5 from disk 2A and stores it in the server cache 12A. Client node B goes out over the network 3 and gets blocks of file 5 from the server cache 12A. Client node B stores the blocks of file 5 as it existed in the server cache 12A into the client cache 12B. When the user address space 14B of client node B seeks data from any block of file 5, the client cache 12B is accessed instead of going across the network 3 for each access. Using the client cache 12B to access a remote file 5 can significantly improve the performance since it can save network traffic and overhead.

The system and method of this invention manages the use of the client cache 12B and server cache 12A in a distributed environment to achieve high performance while preserving the file access semantics at the application program level. This allows existing programs which run on a standalone system to run on a distributed system without any modification. The file access semantics preserves a file's integrity as it is being opened by different processes that issue read and write system calls to access and modify the file. The file access semantics require that only one I/O operation is allowed on any byte range at a time, and once an I/O operation starts, it cannot be pre-empted by any other I/O operation to the same byte range of the file.

Figure 13:
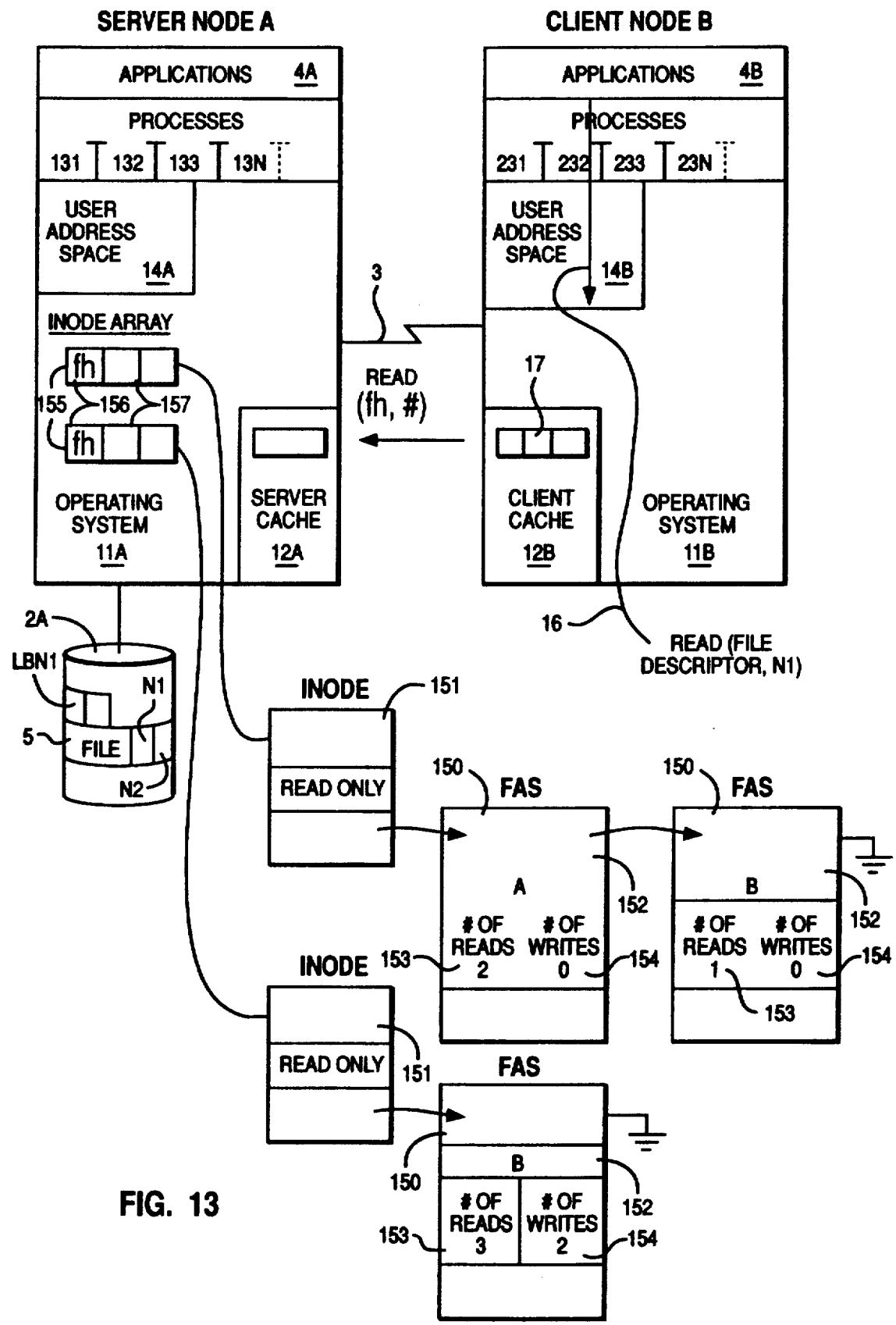
FIG. 13 is a block diagram showing in more detail a portion of the distributed data processing system shown in FIG. 7.

An example of this is given by referring to FIG. 13. If process 131 issues a write system call to a byte range N1-N2 in file 5, the write system call can only be executed when the entire byte range N1-N2 is available for access by process 131, and no read operation involving the byte range N1-N2 is being executed. During the execution of the write system call, all other operations involving the byte range N1-N2 in file 5 are suspended until the write is completed. The write is not completed until the bytes are written to the local cache 12A. When a write request is complete, the written data in the cache 12A is visible to any subsequent read operation by any of the other processes 131 to 13N.

Another requirement of file access semantics is that when a file byte range such as N1-N2, which can be a record or a set of related records accessed by the same I/O operation, is visible to a read process, the file byte range N1-N2 must always have a consistent set of data reflecting the last update to this range. This range is never available for access while a write operation is being executed. In this way, the next read issued by a process will read the data just written and not the old outdated data.

In a distributed networking environment of this invention as shown in FIG. 7, the execution of read and write system calls from different application programs 4A and 4B and processes 131 to 13N and 231 to 23N are synchronized such that the file access semantics as previously discussed are preserved. The system and method of this invention guarantees synchronization by utilizing various cache synchronization (sync) modes.

For a specific file 5, the I/O calls are synchronized by either the client B or the server A depending on the location of the processes 131 to 13N or 231 to 23N which have the file 5 open for access, and the sync mode.

Figure 14:
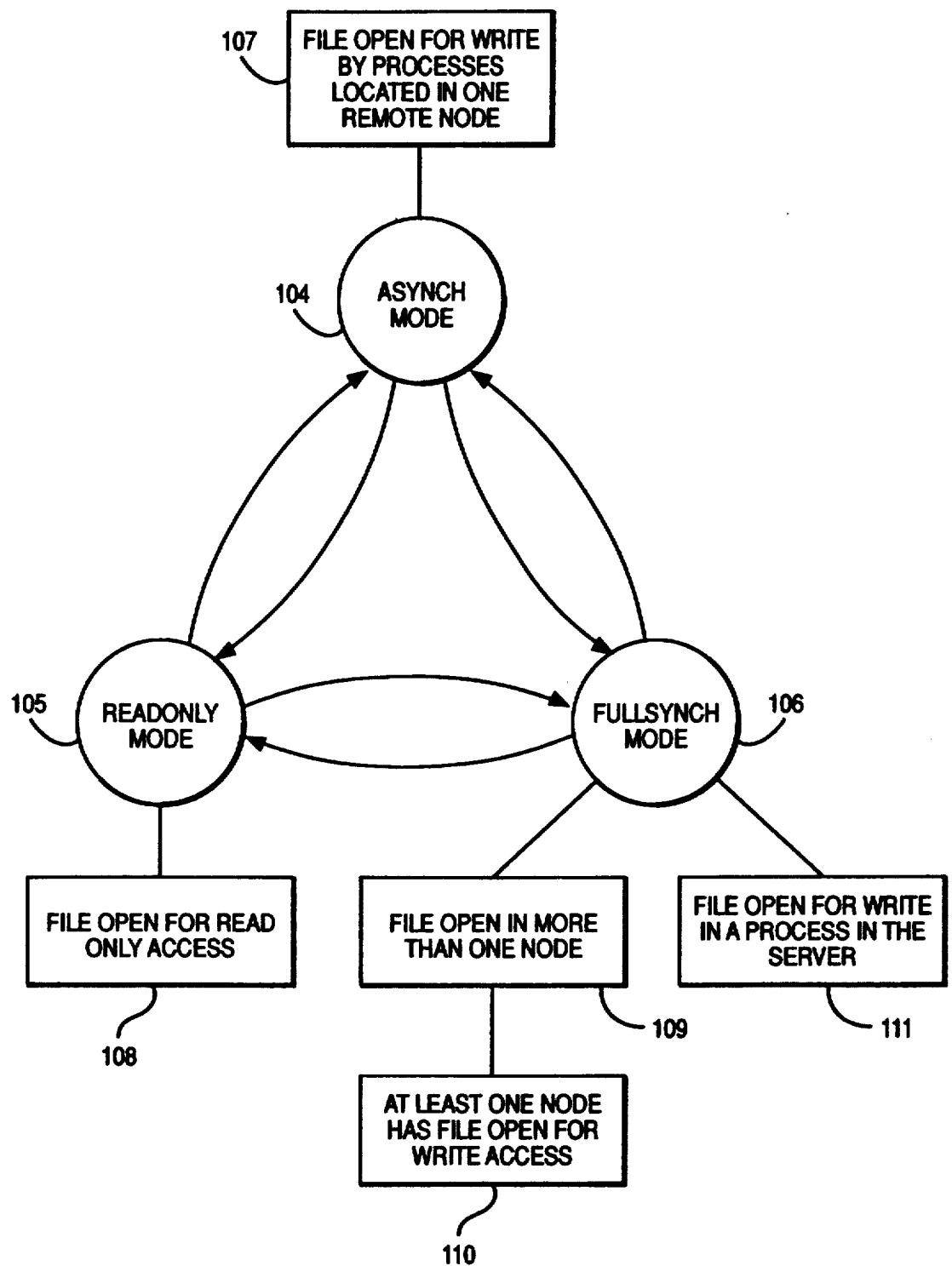
FIG. 14 is a state diagram illustrating the various synchronization modes employed by the operating system which supports the present invention.

The three synchronization modes are shown in FIG. 14 and are described with reference to FIG. 7. The first mode 104 is referred to as ASYNC's_mode, or asynchronous mode. The file 5 operates in this mode 104 if file 5 is open for read/write access by processes 13C executing at only one client remote node C, as shown in block 107 of FIG. 14. In this mode 104, all of the control is in the client node C. Both the server cache 12A and client cache 12C are used for these read/write operations. A read or write operation requires access to the server cache 12A only if it cannot be satisfied from the client cache 12C. Modified blocks at the client 12C are written to the server 12A by the periodic sync operation, when the file 5 is closed by all processes 13C in the client node C, or when more room is needed in the client cache for other data. Additionally, modified blocks are written to the server when the file changes from ASYNC s_mode to FULLSYNC s_ode.

A second mode 105 is READONLY s_mode. The READONLY s_mode 105 is used for files 5 that are open for read only access from processes 13C in only one node C, or from processes 13B and 13C in more than one node B and C as shown in block 108 in FIG. 14. In this mode 105, the server cache 12A and the client caches 12B and/or 12C are used. The read request is issued for a block or more at a time. Every other read request from the same client, either B or C, to the specific block does not go to the server 12. Instead, it is read from the respective client cache, either B or C. In other words, a read operation does not require access to the server 12A if it can be satisfied from the client cache 12C or 12B. In summary, the file 5 operates in mode 105 if the file 5 is open for read only access by any of the processes 13A, 13B or 13C in any of the nodes A, B or C.

A third mode 106 is FULLSYNC s_mode. The FULLSYNC s_mode 106 is used for files 5 open in more than one node A, B and at least one node has the file 5 open for write access. In the FULLSYNC s_mode 106, the client cache 12C or 12B is bypassed, and only the server cache 12A is used. All read and write operations are executed at the server 12A.

In a distributed environment 1 as shown in FIG. 7, most files 5 will more frequently be open for read only by processes 13A, 13B and 13C at several nodes A, B and C in the READONLY s_mode 105 shown in FIG. 14 or open for update at only one node in the ASYNC s_mode 104. It will be less frequent that there will be an open for read and write access by processes executing at more than one node in the FULLSYNC s_mode 106. In both the READONLY s_mode 42 and the ASYNC s_mode 104, the use of a client cache 12B, shown in FIG. 13, significantly reduces the remote read/write response time of accessing file 5 and improves overall system performance.

Figure 15:
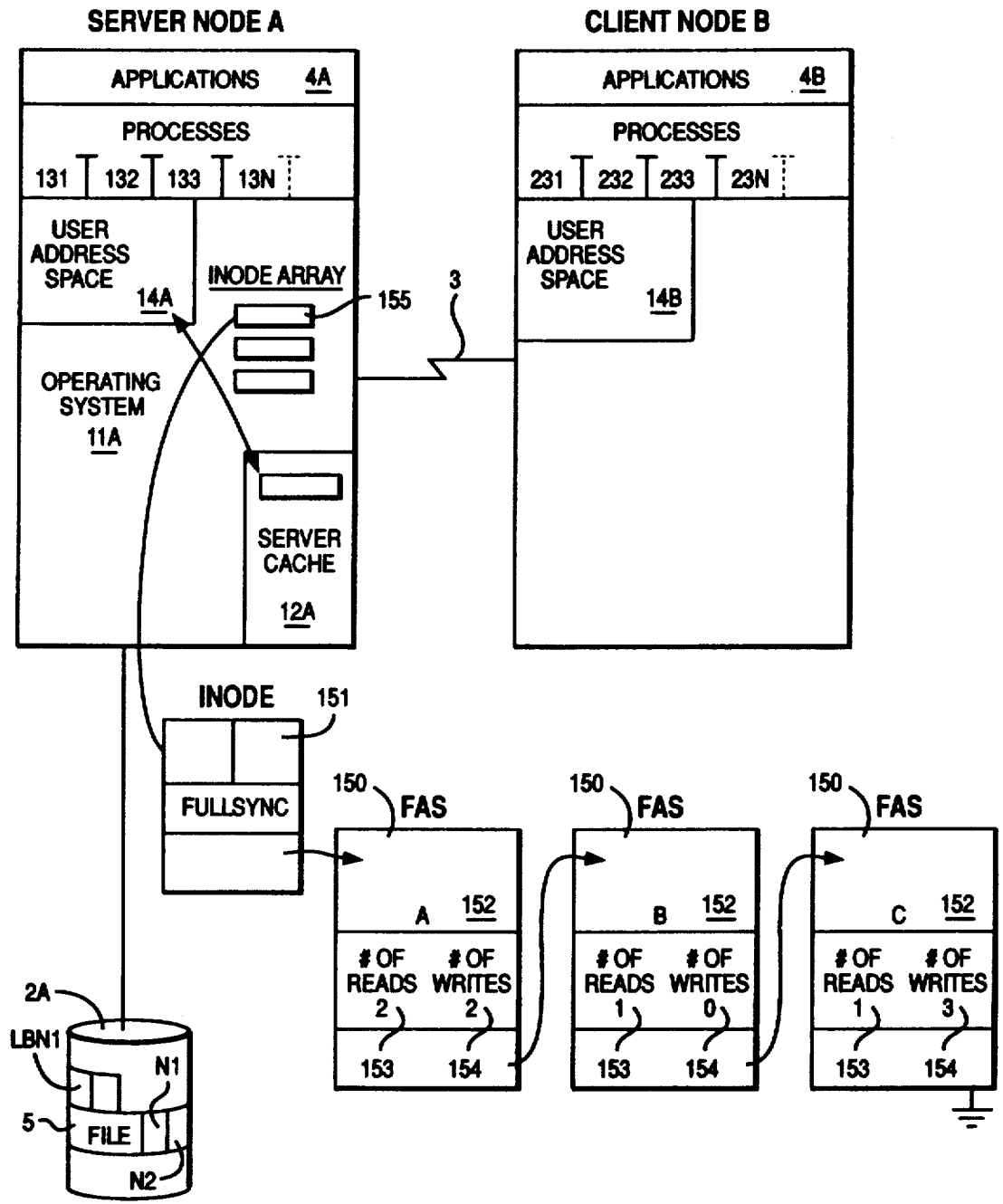
FIG. 15 is a block diagram, similar to FIG. 13, which illustrates the synchronous mode operations.

As shown in FIG. 15, in the FULLSYNC s_mode, the client cache is not used. The client node B accesses the file 5 from the server A over the network 3 for each read and write operation. Although the read/write response time increases in this mode, the file access semantics are preserved since a client does not retain a file 5 in local cache that has not been updated along with the corresponding file residing at the server.

Utilizing the three modes to manage the use of the client cache optimizes overall system performance by combining both an overall average increase in read/write response speed with file integrity. Using a client cache in some situations decreases the read/write response time; while not using a client cache in other situations preserves the file system semantics.

A file's sync mode is not only dependent on which nodes have the file open and whether the file is open for read or write, but also on whether the device where the file resides is open in raw access mode. Raw access for a device means that a block of data LBN1 shown in FIG. 8 within a device 2A is accessed. In this way, the reads and writes of the device 2A read and write to a block LBN1 of device 2A. It is not relevant to which file the block belongs. The device 2A can be opened for raw access from a process 131 to 13N at the server node A. It can not be opened for raw access from a remote node B or C.

Figure 2:
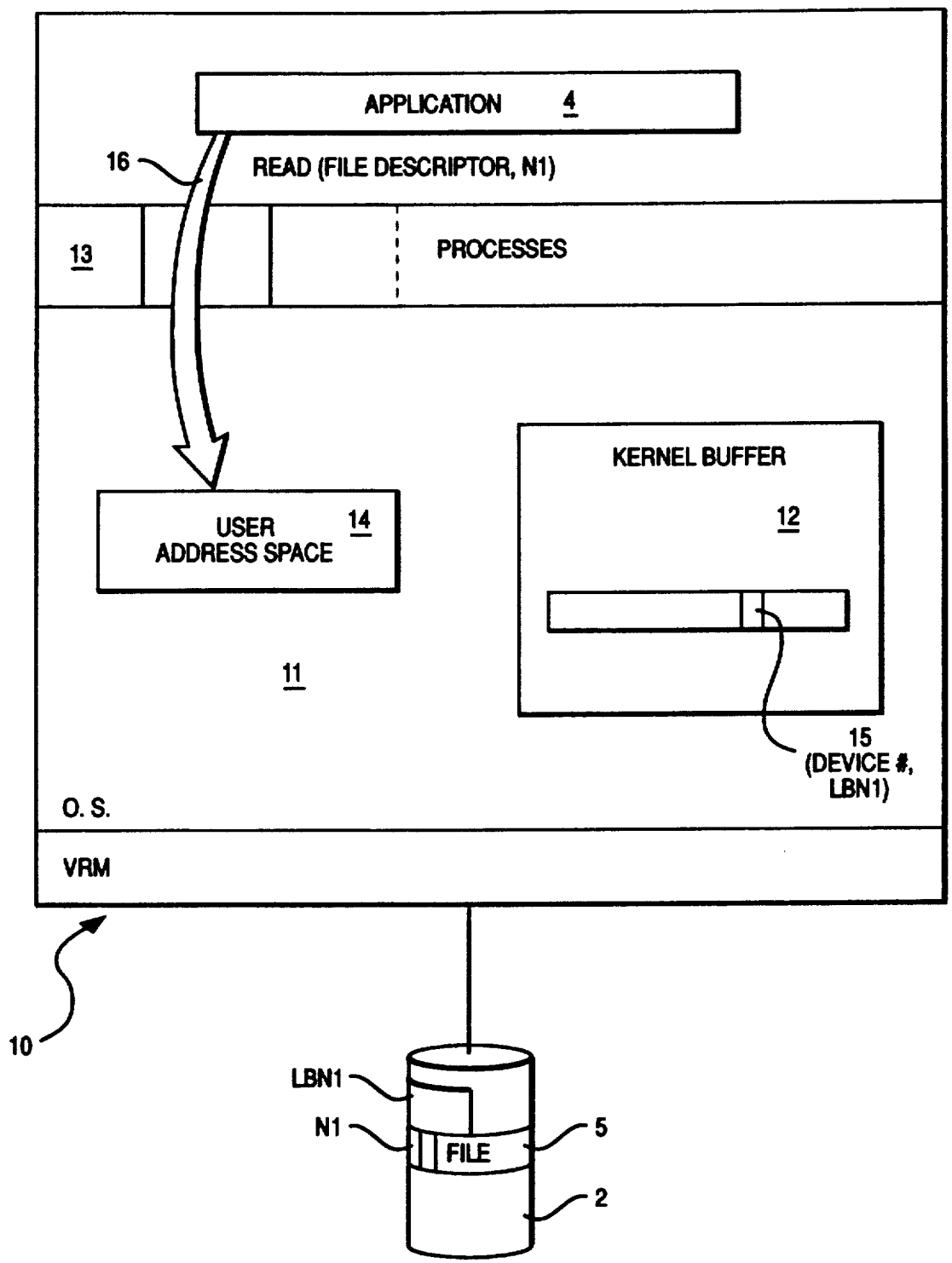
FIG. 2 is a block diagram illustrating a typical standalone processor system.

In FIG. 13, the cache 12A is managed as blocks LBN1 of device 2A, similar to a standalone system as described above with reference to FIG. 2. The server A looks at the server cache 12A as a logical block LBN1 within a device 2A. The client B has no knowledge of where the file 5 resides on the device 2A. All the client B knows is that it accesses a file 5 on block number N1 on device 2A. The client cache 12B handles the data as logical blocks N1 of file 5. In the server cache 12A, the data is handled as logical blocks LBN1 of devices 2A. In handling the data this way, the server can guarantee that if data is written to the device as a raw device, and if there is another read of a block of the file that happens to be the same block that was written to the device, then the read would see the newly written data. This preserves the file system semantics.

If the file is being accessed in a client node B, and the file is in ASYNC or READONLY mode, as shown in FIG. 13, the client operating system 11B does not convert the file descriptor and byte range within the file in the system call READ (file descriptor, N1) 16 to the device number and the logical block number in the device. The client does convert the file descriptor and byte range to a file handle, node identifier, and logical block number within the file. In the client cache 12B, there are blocks 17 that are designated by file handle, node identifier, and logical block number within the file. When a read 16 is issued from a client application 4B, the request for the read goes to the operating system 11B with the file descriptor and the byte range within the file. The operating system then looks in the client cache 12B. If the file handle, node identifier, and logical block number within the file is there, the cache 12B is read; on the other hand, if it is not there, the read is sent to the server. The server then takes the file handle and the logical block number within the file and converts it to a device number and logical block in the device. This conversion is necessary since the server cache 12A is managed by device number and block number within the device as it is in a standalone system. After the read is sent to the server, it is handled the same as if the read was coming from its own application in a standalone system as described with reference to FIG. 2.

Figure 16:
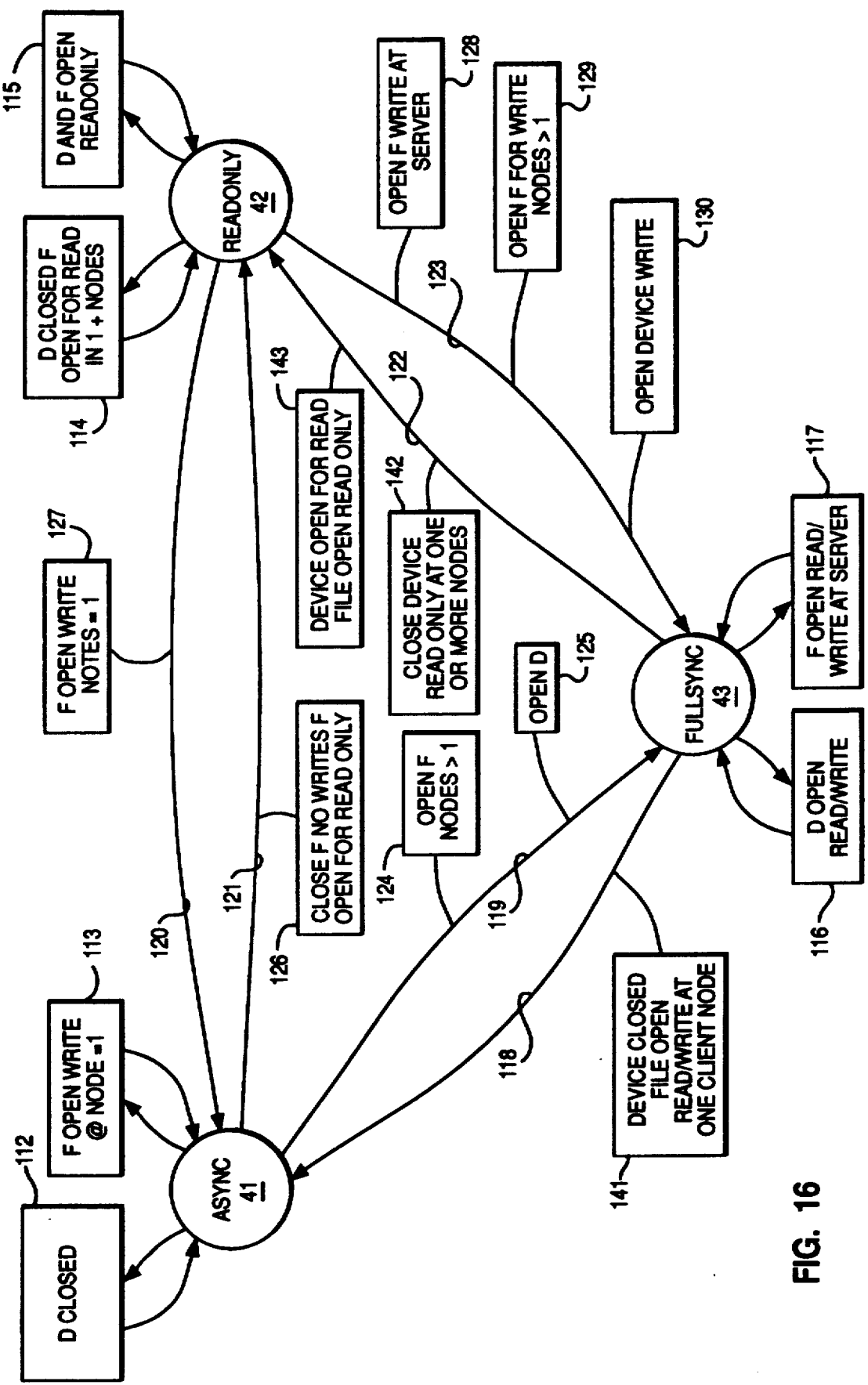
FIG. 16 is a state diagram, similar to the state diagram of FIG. 14, which shows an example of the synchronization modes of the distributed file system.

A closed file does not have a synchronization mode. However, once a file is first opened by a process, the file's sync mode is initialized according to the following as illustrated in FIG. 16. The sync mode for a file is initialized to ASYNC 104 if the device there the file resides is closed 112; i.e., it is not open as a special device and the file is open for write access at one remote node 113. The sync mode for a file is READONLY 105 if the device where the file resides is closed, and the file is open for read only access in one or more nodes 114, or both the device and the file are open for read only access 115. The sync mode for a file is initialized to FULLSYNC 106 if the device where the file resides is open as a block special device for read/write access 116, or the file is open in more than one node and at least one of the opens is for writing. A block special device means that there is a raw access to the device.

Once a file is initialized to a mode, if the conditions change, the file mode may change. Transitions from one mode to another, as shown by lines 118 to 123 in FIG. 16, may occur under the following conditions. If a file is presently in ASYNC mode 104, and the number of nodes where the file is open becomes two or more, 124, then the sync mode changes to FULLSYNC 106 as shown via line 119. Also, if there is an open of the block special device D where the file resides, 125, the sync mode will change from ASYNC 104 to FULLSYNC 106. In a close operation for the file, if the close operation is not the last close of the file, and the file is still open for write, there is no mode change. However, if the close operation is the last close of the file for write access such that all the remaining opens are for read access, 83, then the new mode becomes READONLY 105 as shown via line 121. If the close operation is the last close of the file, then there is no sync mode.

If a file is presently in READONLY s_mode 105 and there is a file open operation, there will not be a mode change if the open is for read. However, if the open is for write, then the new sync mode is ASYNC 104 if all the opens are in one client node, 127, as shown via line 120. Otherwise, the sync mode is FULLSYNC. Furthermore, if the device where the file resides is open for read/write access, 130, the new sync mode for the file is FULLSYNC mode 106. For a close operation, if the close is the last close of the file, there is no sync mode for the file. If the file is still open at one or more nodes after a close operation, there is no change to the sync mode.

If a file is presently in FULLSYNC mode 106 and there is another open for the file, or the device where the file resides is opened, there is no sync mode change. If after a close operation of the file, there remains an open for read/write access at the remote node, and the block special device where the file resides is not open, the sync mode is changed to ASYNC s_mode 104, as shown by block 141 via line 118. The sync mode is changed from FULLSYNC 106 to READONLY 105 if the block special device where the file resides is not open, and the file is open for read only access at one or more nodes as shown by block 142 on line 122, or if the block special device where the file resides is open for read only access and the file is open for read only access as shown in block 143 on line 122.

All open and close operations for files and devices are resolved at the server node. The server determines the sync mode of an open file when executing any operation that may change the mode. The server also performs the change of the synchronization modes. As the server gets new opens or closes for the file, a change in synchronization modes for the file may be triggered. If the required sync mode is not the current one, the server sends a "change sync mode" remote procedure call to all the clients with the file open. After a file is opened for the first time, the client that opened the file is informed of the mode of the file. If the mode is either ASYNC or READONLY, the client can start using the client cache for reads, and also for writes if the mode is ASYNC, as shown in FIG. 13. The client does not have to read or write over the communications link to the server. If the mode is FULLSYNC as shown in FIG. 15, the client cache is not used, and the client must send the read or write over the communications link 3 to the server.

The server A, in FIG. 15, always sets the mode 151 of the file 5. The mode of the file is the same at every node that has the file open. The server A also knows which nodes have the file open, and whether the opens are for reads or writes. The server A does not have to know which processes 131 to 13N, 231 to 23N within a node have a file open. The server keeps all the above information in a file access structure list 150, as shown in FIG. 15. Each element of the file access structure list 150 contains a node which has the file open 152, the number of opens for read 153 in the node, and the number of opens for write 154 in the node.

In the UNIX operating system, processes can lock byte ranges within files so that other processes do not have access to these ranges. Support for such locking has varied from one version of the UNIX operating system to another; however, in most implementations, locks apply to a byte range of a file. A lock over the entire extent of a file locks the file and is sometimes called a file lock. By convention, a request to lock a range of zero bytes in length indicates that all bytes from the beginning of the range to the end of the file are to be locked. This allows a process to lock a file before appending additional bytes to the file while maintaining control over all of the new bytes. A lock over an arbitrary byte range is sometimes called a record lock, but within this document all locks on files and records (byte ranges) will be simply referred to as locks.

In the AIX operating system, lockf(2) and fcntl(2) provide support for both read and write locks. Write locks are exclusive locks: if a range of a file is write locked, no other lock of either kind can exist on that range. Read locks are shared locks: any number of overlapping read locks can apply to a segment of a file. Notice that an existing read lock does not block other read locks, but it does block other write locks; and an existing write lock blocks all other locks on an overlapping range.

Files, in the AIX operating system, are either in enforced locking mode or advisory locking mode. The locking mode of a file is controlled by changing the file's permission codes with the chmod system call. Locks on a file in enforced locking mode are called enforced locks; locks on a file in advisory mode are called advisory locks. An advisory lock does not provide absolute protection for a file or record because it does not prevent a process from reading or writing the locked file or record. Advisory locks only affect the results of calls to lockf(2) or fcntl(2), and so, must be used by processes that are cooperating, by using lockf(2) or fcntl(2) to query the status of locks on the shared files that they are accessing. The advantage of advisory locks is that they do not have to be interrogated by the kernel during ordinary reading or writing operations. Enforced locks will probably be used less often. An enforced lock, like an advisory lock, affects subsequent calls to lockf(2) and fcntl(2); but in addition, each read(2), write(2), open(2), creat(2), fclear(2), ftruncate(2), and shmat(2) insures that no read or write locked portion of the file is being changed and that no write locked portion of the file is being accessed.

Three different commands of the fcntl(2) system call are related to locking:

F_GETLK Find the first existing lock that would prevent the lock described by fcntl(2)'s argument from being granted to the caller.

F_SETLK Grant the lock described by fcntl(2)'s argument to the caller. If the lock cannot be granted because an existing lock interferes with the request, return the description of this existing lock.

F_SETLKW Grant the lock described by fcntl(2)'s argument to the caller. If the lock cannot be granted because an existing lock interferes with the request, check for deadlock and if no deadlock will be caused, cause the caller to wait. Each time an interfering lock is cleared, the kernel again attempts to establish the requested lock by searching for any interfering locks. A process could wait forever. Although deadlocks that involve only file locks on a single node are detected, deadlocks due to file locks on multiple nodes can occur. Also, a process might never deadlock, but it could fail to obtain the lock for an indefinite period because each time an interfering lock was cleared, another interfering lock could already be set.

For each of these commands, a pointer to a structure, the flock structure describing a lock, is provided as an argument in the fcntl(2) call. The flock structure has the following form:

```
struct flock {
    short         l_type;
    short         l_whence;
    long          l_start;
    long          l_len;
    unsigned long l_sysid;
    short         l_pid;
}
```

Figure 18:
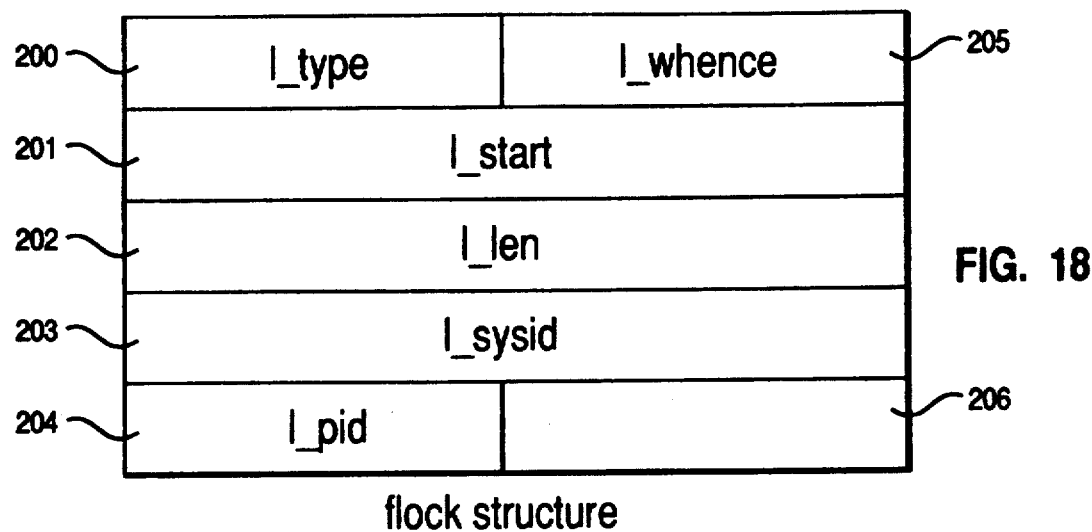
FIG. 18 is a diagram showing the flock data structure.

The fields of the flock structure as shown in FIG. 18 have the following meanings:

l_type 200 is used to indicate whether the lock is a read or a write lock, l_whence 205 is 0 if the byte range for this lock starts at a position relative to the beginning of the file, 1 if the range starts at a position relative to the current position, and 2 if the range starts at a position relative to the end of the file, l_start 201 is the offset, relative to the location specified by l_whence, of the beginning of the range to be locked, l_len 202 is the size of the range to be locked, l_pid 204 is the process id of the lock's owner, returned by fcntl in response to the F_GETLK command, l_sysid 203 is the node id of the node where the lock's owner resides.

Figure 19:
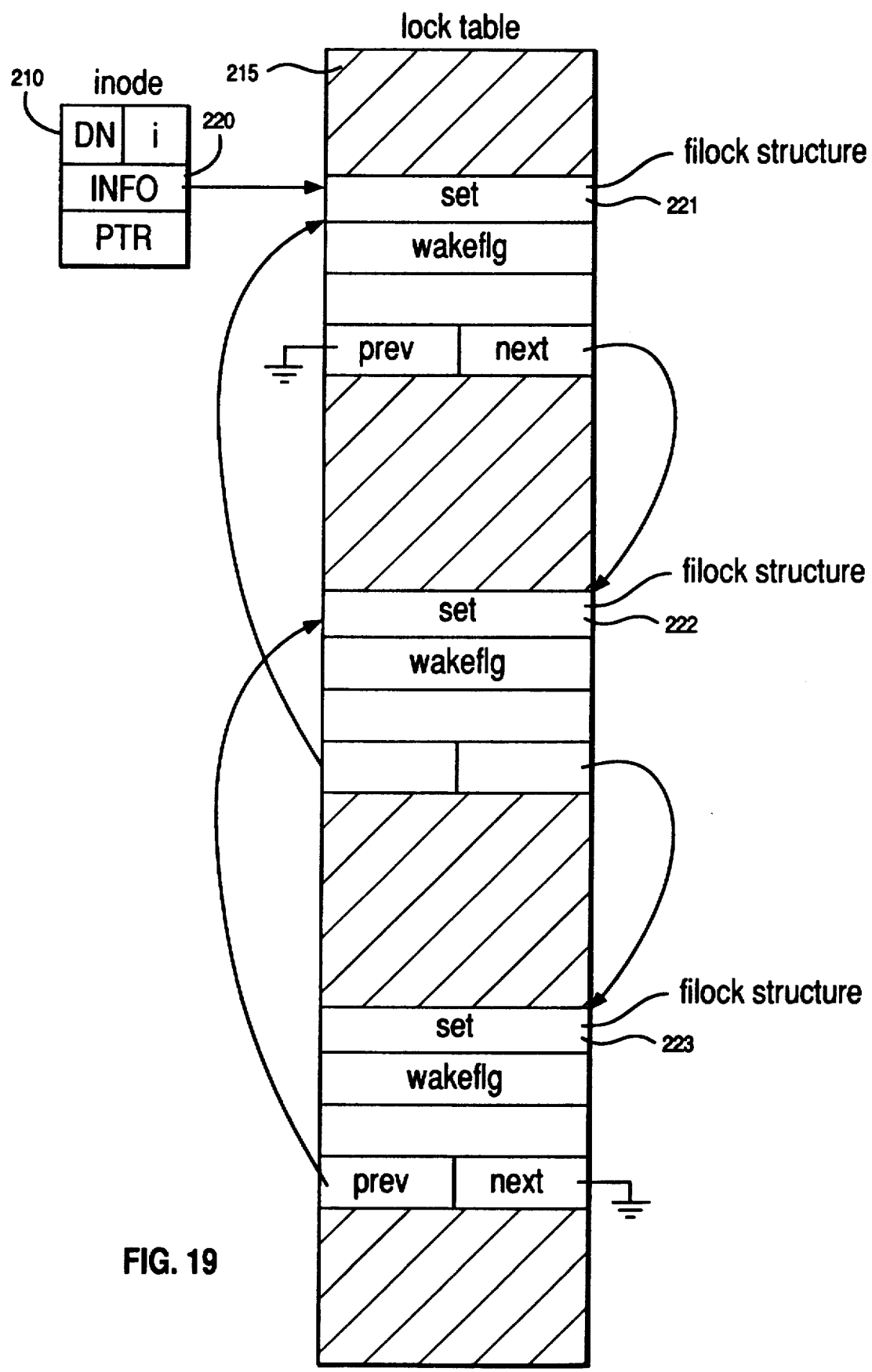
FIG. 19 is a diagram showing the relationship of lock lists, lock table, entries and inodes.

Locks are associated with open files, and it is natural to place lock information with the other information about an open file, in the file's inode structure. In the AIX operating system this is impractical, the inode structure has a fixed size and cannot contain the variable amount of data that could be associated with the locks on a file. Instead, the lock information is stored so that it is reached from the inode structure 210, FIG. 19, and not contained within it. The data associated with file locks is kept in a linked list pointed to by a field 220 of the inode structure 210. This linked list 221, 222, 223 is a list of entries in a table called the lock table 215. Each entry of the lock table has the following form:

```
struct filock {
    struct flock set;
    union {
        int wakeflg;
        struct {
            unsigned long sysid;
            short pid;
        } blk;
    } stat;
    struct filock *prev;
    struct filock *next;
}
```

Figure 20:
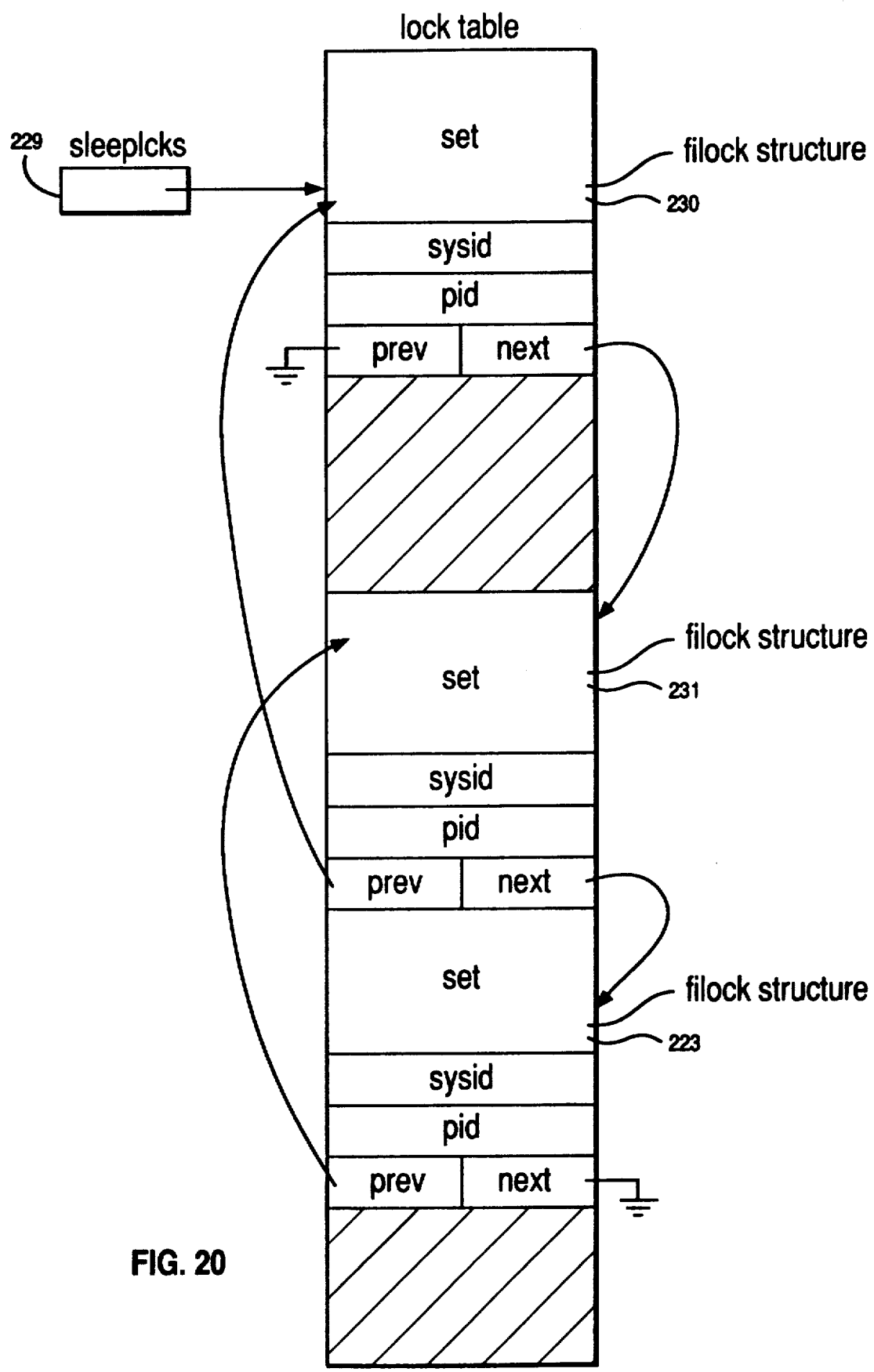
FIG. 20 is a diagram showing the sleep lock list and its relationship to the lock table.

The filock structures 221, 222, 223 are chained together into separate lists, one for each file currently having any locks set. The head of the list is pointed to by a member of the file's inode structure 220. One additional list of filock structures is maintained by the AIX operating system. This list is the sleep list 230, 231, 232, FIG. 20, and is pointed to by the sleeplcks 229. The sleep list has one entry for each process currently trying to establish a lock but prevented from doing so (and hence asleep) because of a preexisting, interfering lock. When used as elements of a linked list 221, 222, 223 of locks on a file, members of the filock structure have the following meanings:

```
set 300 is a flock structure, as shown in FIG. 18,
    containing a description of the locked region
    and the process id and node id of the process
    owning the lock,
stat.wakeflg 304 is set when some process is asleep,
    waiting for the lock corresponding to this
    entry to be released,
stat.blk.sysid and stat.blk.pid are not used,
prev 302 and next 303 are pointers to the previous and
    next elements in the (doubly linked) list.
```

Figure 21:
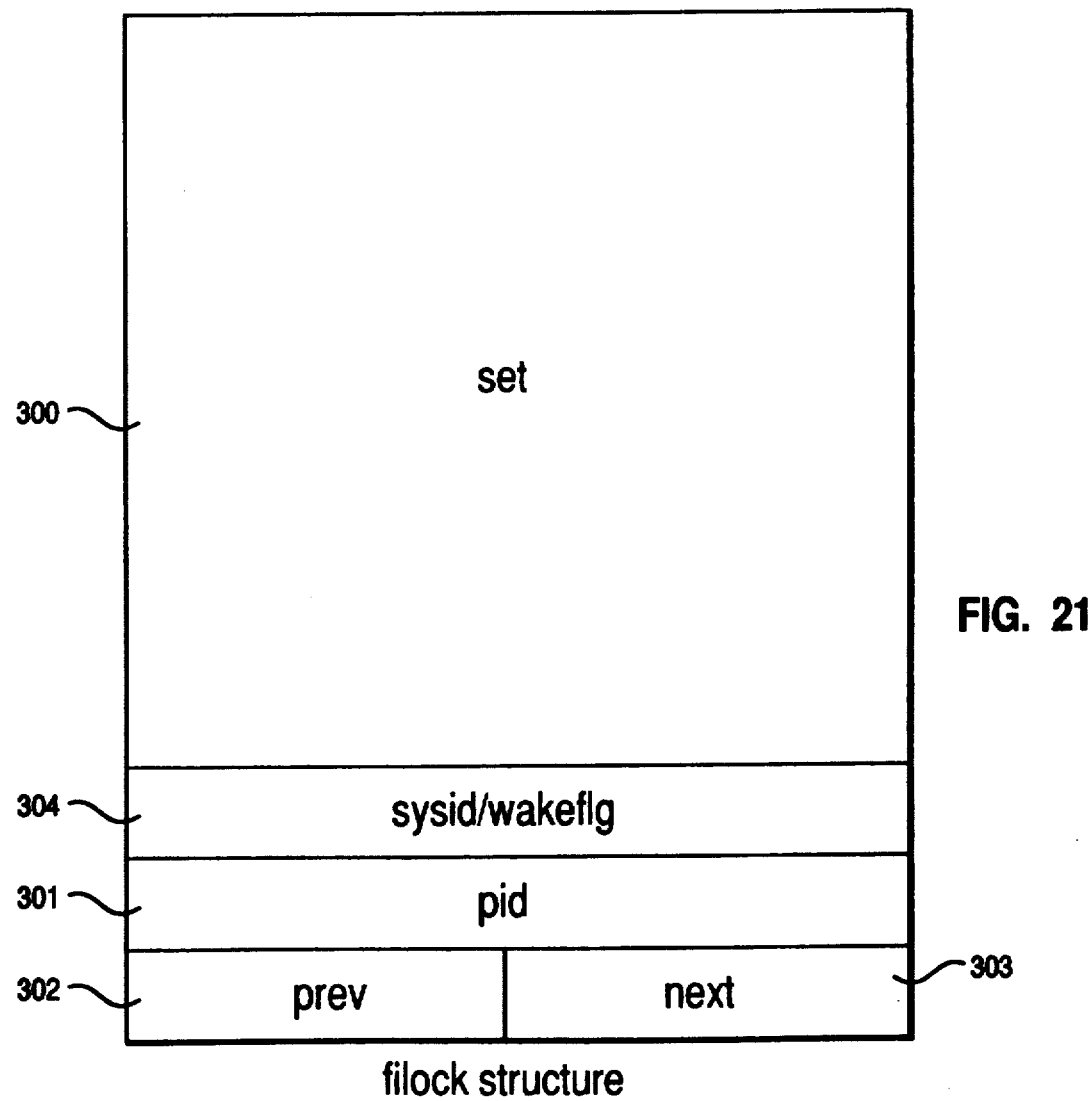
FIG. 21 is a diagram showing the filock data structure.

When used as elements of the sleep list 230, 231, 232, the members of the filock structure FIG. 21 have the following meanings:

```
set 300 is a flock structure, as shown in FIG. 18,
    containing a description of the region that the
    sleeping process wants to lock along with the
    sleeping process's process id and node id,
stat.wakeflg 304 is not used,
stat.blk.sysid 304 is the node id of the process
    owning the lock that blocked the request
    described by the set member,
stat.blk.pid 301 is the process id of the process
    owning the lock that blocked the request
    described by the set member,
prev 302 and next 303 are pointers to the
    previous and next elements in the (doubly
    linked) list.
```

Although there are two different system calls that can be used to perform locking in the AIX operating system, both are implemented by calling a routine named reclock. This routine operates as follows:

```
[reclock]
INPUTS:
    inode pointer, pointer to inode for file to
        be locked,
    file pointer, pointer to file structure for
        file to be locked the file
        structure contains the current
        offset and open mode of the file,
    request, a pointer to an flock structure
        containing a description of region
        to be locked or unlocked,
OUTPUT:
    returns 0 if lock request is granted,
    otherwise returns error indication.
PROCEDURE:
    /* put request into a standard form */
    convert range (l_whence, l_start, and l_len)
    in request to form where l_start is relative
    to beginning of file;
    /* get lock list */
    lock list is pointed to by member of inode
        structure;
    /* attempt request */
    if request is to unlock
        scan lock list for locks owned by process
            that called reclock;
        unlock the portions of any such locks that
            intersect the request's range;
        wakeup any processes that were sleeping on
            a locked range that has had portions
            unlocked;
        return 0 /* success */
    /* otherwise, request is to set a lock */
    /* test for interfering locks on the file */
    while there is an interfering lock
    {
        /* check for deadlock */
        if request causes a deadlock
            return error;
        if there is no room in lock table
            /* i.e. can't put caller to sleep      */
            return error;
        /* now put caller to sleep;                */
        /* an entry of the lock table is           */
        /* chained onto the sleep list;            */
        /* the sleep list has one entry for        */
        /* each process that is asleep and         */
        /* waiting for a lock range to be          */
        /* unlocked; the lock table entry on       */
        /* the sleep list identifies both          */
        /* the sleeping process and the            */
        /* process that owns the lock that         */
        /* the sleeper is waiting for.             */
        add entry to sleep list;
        /* now we are almost ready to put          */
        /* the running process to sleep;           */
        /* first however, release inode if         */
        /* it is locked; this could happen         */
        /* if this code is being executed          */
        /* during a read or write of a file        */
        /* in enforced-locking mode                */
        if inode is locked
            release inode;
        /* finally ready so                        */
        sleep, catch interrupts;
        if interrupted from sleep
            return error;
        else   /* normal awakening;                */
               /* interfering lock is gone;        */
               /* no longer sleeping so            */
            remove entry from sleep list;
            if inode was previously locked
                relock inode;
        /* now loop back and scan the entire       */
        /* list again, locks could have            */
        /* changed while we were sleeping          */
    }
    /* now, no interfering locks are present       */
    add the new lock to the file's lock list;
    /* note that some entries may be merged        */
    if request could be added to lock list
        return 0;                  /* success      */
    else
        /* an error, perhaps there is no more      */
        /* room in the lock table                  */
        return error;
```

In a distributed environment, processes at more than one node can have a single file open at the same time. Each time a lock is added or removed, a file's entire lock list may have to be scanned and updated. A straightforward design of such a system would keep the lock list and sleep list at the file's server: each time a lock is applied, requests are sent to the server (unless a process local to the server is applying the lock) to perform the necessary actions on the lock list and possibly sleeping process list. A system based on this straightforward design has the disadvantage of unnecessary network traffic and delays when the only process having a file open are all running at a single non-server node.

Most often, files in an AIX operating system are opened by a single process; if the process is running at a client (non-server) node, the straightforward design described above would introduce the undesirable costs of communicating with a remote server in this common situation each time a lock was changed or tested. Sometimes, a file in an AIX operating system is open by many different processes at the same time, all of which could be located at different nodes in a distributed environment. Any design for file and record locking in an AIX operating system should avoid the costs of the straightforward design in the simple more common cases and work properly, even if not as efficiently, in the less common more complex cases. The invention described in this application accomplishes these conflicting goals.

One solution to the problem might be to keep copies of the lock list and sleep list at all nodes where it could be useful. The problem with this approach is that the lists don't stay consistent with each other as changes are being made unless one list is denoted the master, in which case all changes must be communicated with the master anyway and no advantage over the straightforward design are realized, or changes to each list are carefully negotiated with other nodes having copies of the lists, producing additional undesirable overhead in network traffic and delays each time a lock is modified.

The invention described in this application keeps only one copy of the lock list for each file. The lock list information is kept at the server, step 404 of FIG. 22A, when there are several processes located at different nodes having the file open, steps 406, 402, 403, 404, and 405 of FIG. 22A, and the information is kept at the non-server node, step 413 of FIG. 22A, in the frequent case of all processes with the file open running at a single node steps 406, 411, 412, 413, and 414 of FIG. 22A. The problems of multiple copy consistency are avoided, and the inefficiencies of requiring network messages for each lock operation in the common case where all opens are at one node are also avoided.

There are two important implications of this architecture. First, processes may have to use remote procedure calls (RPC)s to set or test locks. These RPCs will run on the file's server. Second, when the synch mode of a file changes, the file's lock list may have to be moved from the client to the server, steps 502, 504, 505, and 506 of FIG. 22B, or vice-versa, steps 502, 504, 507, and 508 of FIG. 22B. The entries of an inode's lock table correspond to locks over segments of the inode's file. To represent a lock, a lock list entry must contain information identifying the range of bytes locked, the type of lock (read or write), the owner of the lock.

In standalone UNIX operating system a process that tries to establish a lock may have to wait for an existing lock to clear first. Before waiting (going to sleep) the process must check the sleep list to insure that no deadlock will occur if it does wait. A waiting process has its proc table use the W_CHAN field of the proc table to point to the lock table entry that it is waiting on.

In a distributed system, waiting is not as easy. There are two ways to wait on a blocking lock: 1) directly on a local lock list entry and 2) indirectly on a server lock list entry. Direct waiting is identical to the standalone waiting described above. It is used anytime that a process must wait for a lock that occurs locally in a lock table. It is important to remember that a lock list for a file resides in only one node. If the calling process is not in the same node then the lock list is in the server. A process that attempts to lock a region of a file that has its lock list located in a remote node (server) waits on the lock indirectly. This indirect waiting is done by an RPC that invokes a transaction program in the server and waits on the lock. In a standalone UNIX operating system, a process never enters the SLEEP state if a lock can be granted or if waiting could create a deadlock. In a distributed system, a process performing a lock request that does not reside in the same node as the lock table always enters the SLEEP state, at least briefly. It must do so while it is waiting for the RPC to return. In order to avoid unnecessary network communication, a process that is waiting for the reply from a dfs_flock RPC will not know if it is waiting because the RPC transaction program is in turn waiting for a blocking lock or if it is waiting because the transaction program has not finished running in the server where no blocking lock was found.

Figure 22A:
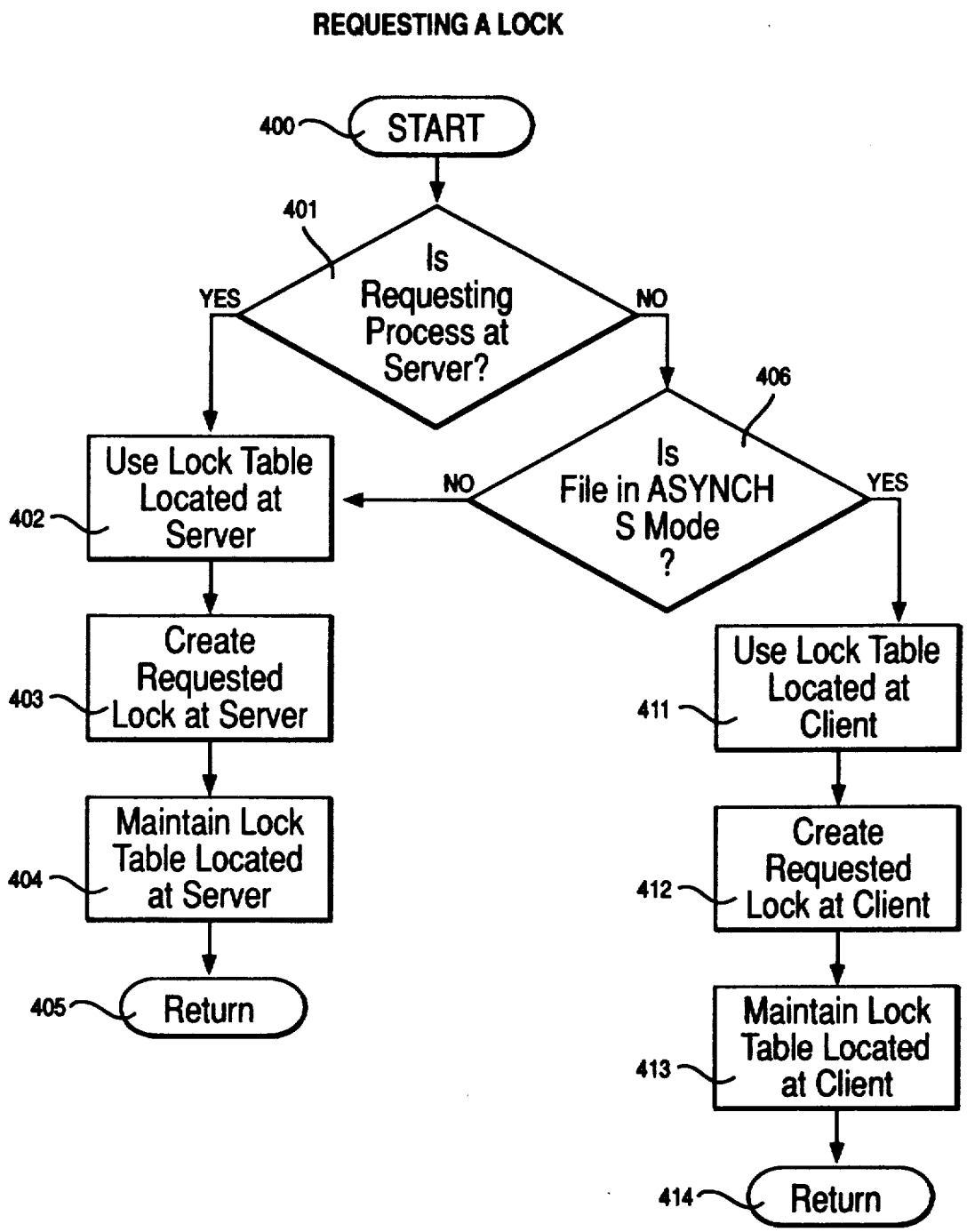
FIG. 22A is a flow chart showing the high level operation of requesting a lock.

When a lock is first applied to a file that has no other locks, an entry is made in the server lock table if the file is open in FULLSYNCH mode or READONLY mode, step 403 of FIG. 22A; an entry is made in the client lock table if the file is open in ASYNCH mode, step 412 of FIG. 22A. Additional entries are made in the same table and chained together to form a file lock list, as long as no open, close, or chmod system calls change the file synchronization mode. (Note that chmod can change the file sync mode by placing a file in enforced-locking mode, steps 500 and 501 of FIG. 22B. A file in enforced-locking mode is always treated as if it is in FULLSYNCH mode, regardless of the number of processes having the file open.) When a file's synch mode changes tested in steps 502 and 504 of FIG. 22B, due to an open for example, steps 500 and 501 of FIG. 22B, the lock list and sleeping processes are moved from one node to another, steps 505, 506, 507, and 508 of FIG. 22B.

Figure 22B:
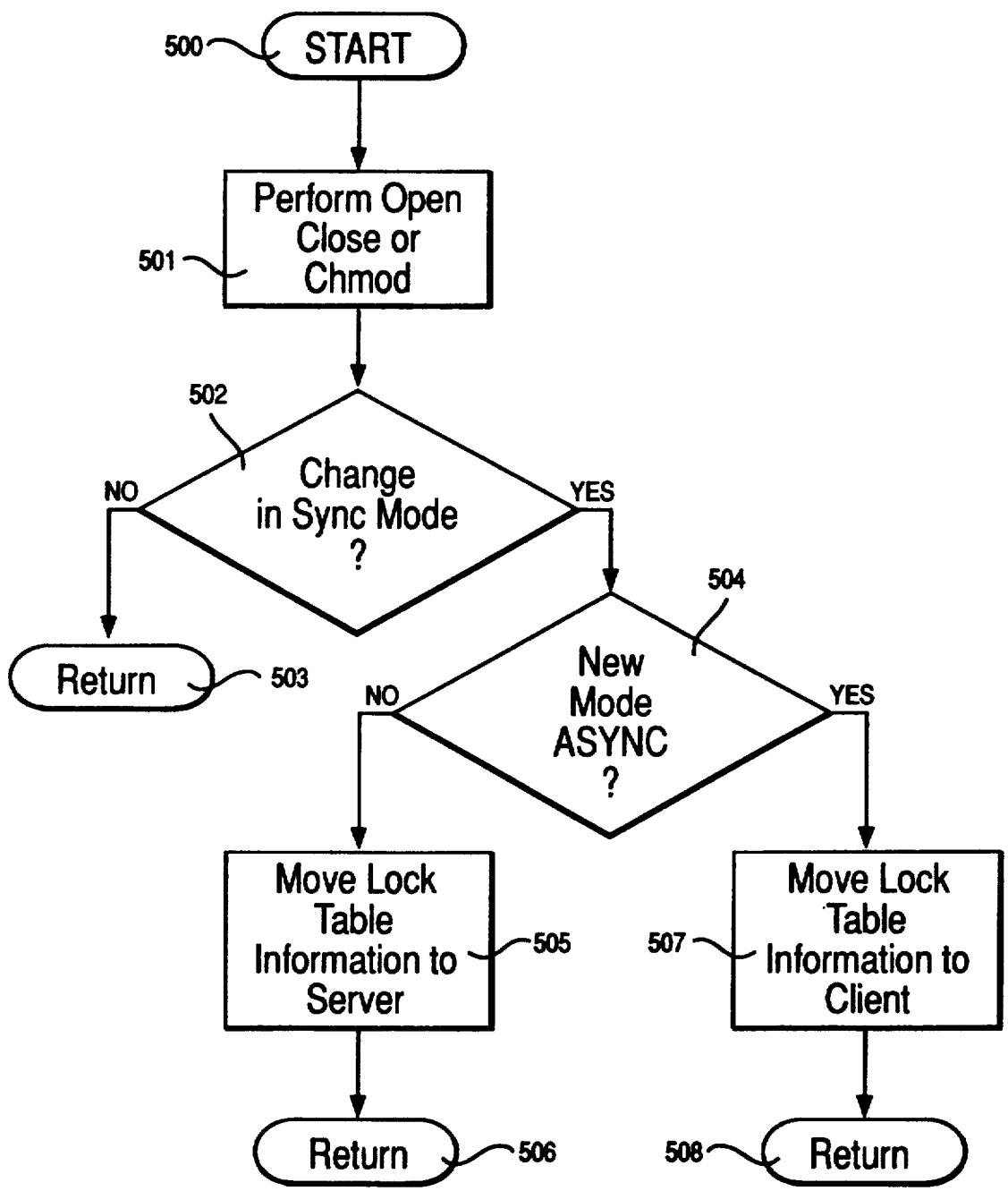
FIG. 22B is a flow chart showing the high level operation of OPEN/CLOSE or CHMOD processing.

Files in enforced-locking mode have FULLSYNCH synchronization mode, and like other FULLSYNCH files, the lock lists for enforced-locking mode files are kept at the server, step 404 of FIG. 22B.

Complications that must be addressed by the invention include the problems of when is the lock list information moved between nodes, how is the lock list information moved between nodes, and how are the processes sleeping while waiting for locks managed. Although the data structures used in AIX(TM) to support the file and record locking in a distributed environment are the same as those described above for standalone operation, the procedures used to add and remove locks are different in a distributed system. The system calls lockf and fcntl on a client node, (the test at step 401 of FIG. 22A is used to determine this), that is a node in a distributed environment that does not contain the file to be locked, are implemented with calls to the raix_flock. The routine raix_flock works as follows:

```
[raix_flock]
INPUTS:
    vnode pointer, pointer to vnode for file to
        be locked,
    file pointer, pointer to file structure for
        file to be locked, the file
        structure contains the current
        offset and open mode of the file,
    request, a pointer to an flock structure
        containing a description of region
        to be locked or unlocked,
OUTPUT:
    returns 0 if lock request is granted,
    otherwise returns error indication.
PROCEDURE:
    /* put request into standard form */
    convert range (l_whence, l_start, and
        l_len) in request to form where
        l_start is relative to beginning of
        file;
    /* keep trying until error or done */
    while( TRUE )
    {
        if file is in ASYNCH mode (step 406 of FIG. 22A)
        {
            /* do local processing */
            /* lock the file's surrogate inode,     */
            /* waiting until we can. File's         */
            /* surrogate inode is pointed to by a   */
            /* member of a file's vnode structure   */
            wait until surrogate inode is unlocked,
                then lock it;
            /* could have slept in the previous     */
            /* step, so test synch mode again       */
            if file is not in ASYNCH mode
                /* mode has changed so try again    */
                goto retry;
            /* Ok, still in ASYNCH mode */
            /* step 411 of FIG. 22A */
            if request is to unlock a region
                scan lock list for locks owned by
                    calling process;
                unlock the portions of any locks
                    that intersect the unlock
                    request's range;
                wakeup any processes that were
                    sleeping on a locked range
                    that has had portions;
                goto success;
            /* else, request is to set a lock */
            /* test for any interfering locks */
            while there is an interfering lock
            {
                /* check for deadlock */
                if request causes deadlock
                    /* can't grant it */
                    goto errorexit;
                if there is no room in lock table
                    /* can't put caller to sleep */
                    goto errorexit;
                /*now put caller to sleep;                  */
                /*an entry of the lock table is             */
                /*chained onto the sleep list;              */
                /*the sleep list has one entry for          */
                /*each process that is asleep and           */
                /*waiting for a lock range to be            */
                /*unlocked;the lock table entry on          */
                /*the sleep list identifies both            */
                /*the sleeping process and the              */
                /*process that owns the lock that           */
                /*the sleeper is waiting for.               */
                add entry to sleep list;
                /*now we are almost ready to put            */
                /*the running process to sleep;             */
                /*first however, release inode if           */
                /*it is locked; this could happen.          */
                /*if this code is being executed            */
                /*during a read or write of a file          */
                /*in enforced-locking mode                  */
                if inode is locked
                    release inode;
                /* finally ready so */
                sleep, catch interrupts;
                if interrupted from sleep
                    goto errorexit;
                /* normal awakening */
                /* interfering lock is gone    */
                /* no longer sleeping so       */
                remove entry from sleep list;
                /* has synch mode changed?     */
                if file sync mode is not ASYNCH
                    goto retry;
                if surrogate inode was previously
                        locked
                    relock surrogate inode;
                /* now loop back and try again */
            }
            /* now, no interfering locks exist */
            /* step 412 of FIG. 22A */
            add new lock to the file's lock list;
            /* step 413 of FIG. 22A */
            if request could be added to list
                goto success;            /* success */
            else
                goto errorexit;
        }
        else /* file is not in ASYNCH mode */
        {
            request lock at server,
                use dfs_flock rpc;
            /* dfs_flock rpc will invoke    */
            /* aix_flock at the server to   */
            /* perform the remote locking   */
            if error
                goto errorexit;
            else if no errors
                goto success
            /* neither error nor success,            */
            /* lock request happened during          */
            /* a synch mode change so just           */
            /* retry it                              */
        }
    retry:
        if surrogate was unlocked
            unlock surrogate;
        /* now loop back and try again */
    }
    errorexit:
        if surrogate was unlocked
            unlock surrogate;
        return error;
    success:
        if surrogate was unlocked
            unlock surrogate;
        return 0;
```

This function, raix_flock, is invoked by calls to lockf or fcntl for remote files. That is, when a process at a client node uses lockf or fcntl on a file at a server node, raix_flock will be executed on the client (NO branch of test at step 401 of FIG. 22A). If the file is open at the client in ASYNCH file synchronization mode, raix flock will perform only local operations (YES branch of test at 406 of FIG. 22A); if the file is open at the client in a mode other than ASYNCH (NO branch of test at 406 of FIG. 22A), raix_flock will use the dfs_flock rpc, causing a kernel process to run in the server, steps 402, 403, 404, and 405 of FIG. 22A. This kernel process will lock or unlock the specified range at the server, where, in this case, the file's lock list resides. The dfs_flock rpc sent by the client causes the dfs_flock function to be run, by a kernel process, at the server. The dfs_flock function's operation can be described as follows:

```
[dfs_flock]
INPUTS:
    (received as a part of dfs_flock rpc)
    file handle, handle for file to be locked,
```

```
    file structure, file structure for the file to be
        locked containing the current offset and open
        mode of the file,
    request, a structure containing a description of
        the the region to be locked or unlocked,
OUTPUT:
(returned as a part of reply to dfs_flock rpc)
    returns 0 if lock request is granted,
    returns error number if error,
    returns EBUSY if operation failed and should be
        retried because of synch mode changes
PROCEDURE:
    if there is no vnode corresponding to the file
        handle
    {
        /* file is no longer open */
        send error back in reply;
        /* requestor cannot still be awaiting      */
        /* reply, since that would imply that      */
        /* the file was still open                 */
    }
    perform lock operation using aix_flock;
    /* aix_flock is called indirectly though       */
    /* vn_lockf                                    */
    if error
        send back error in reply;
    else EBUSY
        send back EBUSY in reply;
    else
        send back reply with indication of success
            with return confirmation requested;
        if return confirmation indicates
            that no process received reply
        {
            /* original requesting process is      */
            /* gone, so                            */
            unlock original requested lock;
        }
```

The dfs_flock function invokes the vn_lockf vnode operation to perform locking at the server in response to the dfs_flock RPC request. The vn_lockf vnode operation at the server will map into a call of the aix_flocl function (the YES branch of test at 401 of FIG. 22A). This function is similar to the raix_flock routine, but has to be concerned with the manipulation of the file access structure lock. Notice that after attempts to acquire this lock and the lock on the inode, aix_flock has to allow for the possibility of changes in the file's synchronization mode. Sleeping could have occurred while waiting for these locks. During the sleep periods, additional opens or closes could have been performed on the file.

A description of the detailed operation of aix_flock follows:

```
[aix_flock]
INPUTS:
    vnode pointer, pointer to vnode for file to
        be locked,
    file pointer, pointer to file structure for
        file to be locked, the file
        structure contains the current
        offset and open mode of the file,
    request, a pointer to an flock structure
        containing a description of region
        to be locked or unlocked,
OUTPUT:
    returns 0 if lock request is granted,
    otherwise returns error indication.
PROCEDURE:
    /* put request into a standard form */
    convert range (l_whence, l_start, and l_len)
        in request to form where l_start is relative
        to beginning of file;
    /* get lock list, step 402 of FIG. 22A */
    lock list is pointed to by member of inode
        structure, inode structure is pointed to
        by member of the vnode structure;
    /* get file access lock */
    wait for file access lock and lock it;
    /* could have slept, check mode */
    if file synchronization mode is ASYNCH
        goto ebusy;
        /* notice that this cannot happen when     */
        /* there is a file open at the server      */
    /* attempt request */
    if request is to unlock
        scan lock list for locks owned by process
            that called reclock;
        unlock the portions of any such locks that
            intersect the request's range;
        wakeup any processes that were sleeping on
            a locked range that has had portions
            unlocked;
        goto success;
    /* otherwise, request is to set a lock */
    /* test for interfering locks on the file */
    while there is an interfering lock
    {
        /* check for deadlock */
        if request causes a deadlock
            goto errorexit;
        if there is no room in lock table
            /* i.e. can't put caller to sleep      */
            goto errorexit;
            /* now put caller to sleep;            */
            /* an entry of the lock table is       */
            /* chained onto the sleep list;        */
            /* the sleep list has one entry for    */
            /* each process that is asleep and     */
            /* waiting for a lock range to be      */
            /* unlocked; the lock table entry on   */
            /* the sleep list identifies both      */
            /* the sleeping process and the        */
            /* process that owns the lock that     */
            /* the sleeper is waiting for.         */
        add entry to sleep list;
            /* now we are almost ready to put      */
            /* the running process to sleep;       */
            /* first however, release inode if     */
            /* it is locked; this could happen     */
            /* if this code is being executed      */
            /* during a read or write of a file    */
            /* in enforced-locking mode            */
        if inode is locked
            release inode;
            release file access structure lock;
        /* finally ready so                        */
        sleep, catch interrupts;
        if interrupted from sleep
            goto errorexit;
        if synchronization mode is ASYNCH
            /* it changed during sleep */
            goto ebusy; /* need to retry */
        remove entry from sleep list;
        lock file access structure lock;
        if inode was previously locked
            relock inode;
        /* now loop back and scan the entire       */
        /* list again, locks could have            */
        /* changed while we were sleeping          */
    }
    /* now, no interfering locks are present       */
    add the new lock to the file's lock list,
    step 403 of FIG. 22A;
    /* note that some entries may be merged,
    step 404 of FIG. 22A                           */
    if request could be added to lock list
        goto success;       /* success             */
    else
        /* an error, perhaps there is no more      */
        /* room in the lock table                  */
        goto errorexit;
errorexit:
    release file access structure lock;
    return error;
ebusy:
```

-continued
```
    release file access structure lock;
    return EBUSY;
success:
    return 0;
```

During the period of time that a file synchronization mode change is happening, the structures describing the file are being updated at both the server and some non-server nodes. Because the updates involve communication with a remote node, the processor can be preempted after the updates have started and before they are finished. To prevent processes from finding partially updated and hence inconsistent information about a file during the time that the synchronization mode is changing, the AIX operating system uses file access structure locks. Each opened file has a file access structure lock that can be set to indicate to other processes that the operating system information about the file is possibly inconsistent.

The procedure aix_flock, shown above, goes to sleep waiting on an interfering lock under some conditions. Before doing so it is important that the file access structure lock be released. If aix_flock did not release the file access structure lock before waiting for some locks, a deadlock could occur.

The source code for the file access structure is provided below with some descriptive information to show the detailed logic:

```
STRUCT   FILE_ACCESS
{ /*
File Access Structure Pointer
                                            */
STRUCT   FILE_ACCESS *FA_NEXT; ;       /*
File Access Structure Flag
                                            */
SHORT    FA_FLAG; /*
File Access Structure Total Users
                                            */
SHORT    FA_COUNT; /*
File Access Structure Read/Only Count
                                            */
SHORT    FA_OROCNT; /*
File Access Structure Read/Write Count
                                            */
SHORT    FA_ORWCNT; /*
File Access Structure Executing Processes
                                            */
SHORT    FA_TXTCNT; /*
File Access Structure Node Structure Ptr.
                                            */
STRUCT   NODE *FA_NID; /*
File Access Structure Node ID
                                            */
INT      FA_NID; /*
File Access Structure S_INODE Pointer
                                            */
STRUCT   INODE *FA_SIP; };
```

File Access Structure Lock

The file access structure lock fas_lock is used to synchronize the use of the inodes and surrogate inodes (s_inode) for open files in a distributed file system (DFS). The synchronization is performed to avoid a deadlock situation which can occur if an inode and the s_inodes are locked.

In a standalone AIX operating system, execution of system calls that require access to a file F are serialized by locking the inode for F during the entire execution time of any system call for that file. In DFS, if file F is open at a remote node C, a s_inode is created at node C to represent file F. Thus, two resources are involved: the inode for the specific file at the server node where the file resides, and the s_inode at the client node where the file is open. To serialize system calls executing at client C, the s_inode for file F is locked during the execution time for each call. If an access to the server is required to read a block of data not available in the client cache, the inode for file F is also locked.

Locking the inode for file F in the server and the s_inode for file F in the client for the entire execution time of each system call can lead to a deadlock situation if the order in which the two resources are acquired is not always carried out in the same order. Typically, the s_inode is locked first and then the server is accessed via a remote procedure call (RPC) and the inode is locked. However, there are some exceptions to the above order. Under certain conditions, the server may lock the inode and then send a RPC to the client which requires the locking of the s_inode.

A deadlock can occur in any one of the following situations in which two operations are currently executing O1 and O2:

a) O1 is executing at a client node. O1 locks the s_inode and tries to lock the inode in the server for a read operation.

b) O2 is executing in the server. O2 locks the inode and initiates a RPC to the client node to open a file. The execution of the RPC request in the client node waits on the s_inode to lock it.

Because both operations are executing and require the same two resources and each have acquired one and are waiting on the other locked resource, a deadlock situation is present. In examining the cause, note that the deadlock occurs during the execution of the RPC from the server to the client. The inode on the server is locked first and an attempt is made to lock the s_inode. This is the reverse of most cases where the s_inode is locked first and then sends a RPC to lock the inode.

Figure 17:
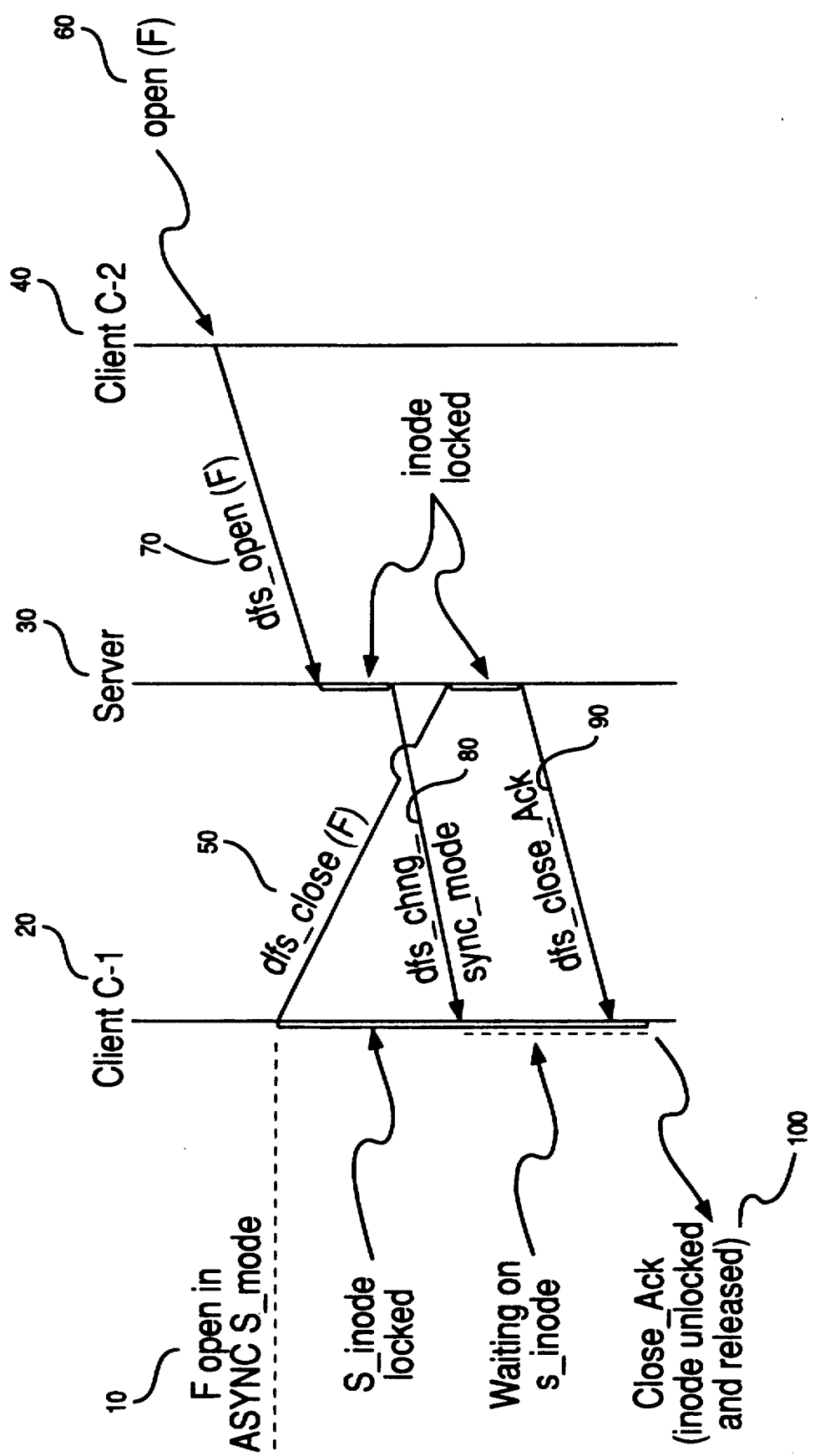
FIG. 17 is a diagram showing the control flow of accesses to a file by two client nodes.

To prevent the above problem from occurring, the server could unlock the inode before originating a RPC to lock the s_inode to the client. Unlocking the inode during the execution of the open operation will solve the above problem; however, it complicates the sync mode change management for open files since more than one open and/or close operation can occur at the server in parallel. It may also introduce another problem as shown in FIG. 17. In FIG. 17 file F at 10 is open in ASYNC mode by only one process in client node C-1 at 20. Two operations are in progress: a close operation from C-1 at 20 and an open operation at 60 for the same file F at label 10 from another client C-2 at label 40. The close operation from C-1 at label 20 will lock the s_inode (which has a use count of 1) and sends a "dfs_close" RPC at label 50 to the server at label 30. The open operation from C-2 at label 40 sends a "dfs_open" RPC at label 70 to the server at label 30. This RPC arrives at the server and executes before the "dfs_close" RPC at label 50 from C-1 at label 20. The s_mode for file F is ASYNC, so the server unlocks the inode and sends a "dfs_chng_sync mode" RPC at label 80 to C-1 at label 20 requesting that file F at label 10 be changed to FULLSYNC s_mode. This RPC will arrive at C-1 at label 20 and wait for the s_inode to be unlocked. Next, the "dfs_close" RPC at label 50 arrives at the server. Since the inode for file F at label 10 is not locked at the server, the close operation executes at the server and a "dfs_close_ack" RPC at label 90 is sent to C-1 at label 20. When the "dfs_close_ack" RPC at label 90 arrives at C-1 at label 20, the use count on the s_inode is decremented and since the use count's value is zero, the s_inode is released at label 100. This leaves no s_inode for the sync mode change to be applied to in C-1 in label 20.

A solution to this problem is to have the sync mode change procedure increment the use count of the s_inode before waiting on it. However, this approach raises more management headaches for the file management system. A better approach is to introduce a new lock, the file access structure lock (fas_lock). Use of the fas_lock will eliminate the inode from being a critical resource. The two critical resources will be the s_inode in the client node and the fas_lock at the server. To prevent a deadlock, any operation executing at a client node which requires holding the fas_lock should unlock the s_inode before a RPC is sent to the server.

Operations that generate a RPC from the server to clients must acquire the fas_lock before sending a RPC. Examples of situations in a UNIX operating system and/or an AIX operating system environment are:

| Remote Procedure Calls (RPC): | |
|---|---|
| * DFS_OPEN | * DFS_CREATE |
| * DFS_CLOSE | * DFS_GET_ATTR |
| * DFS_SET_ATTR | * DFS_LOOKUP |
| * DFS_CHNG_SYNC_MODE UNIX System Calls From | |
| Server Processes: | |
| * OPEN | * CLOSE |
| * CREAT | * STAT |
| * FULLSTAT | * CHMOD |
| * EXIT | |

The above UNIX operating system and AIX operating system operations correspond to the following vn_ops:

| * vn_open | * vn_create |
|---|---|
| * vn_close | * vn_getattr |
| * vn_setattr | * vn_lookup |

An example of a vn_ops execution is discussed below. The operation is executed at a client node and locks the s_inode as usual if any local processing is necessary. If one of the above listed RPCs is sent to the server, then the s_inode is unlocked before the RPC is sent. In the server, the RPC request will lock the fas_ lock or wait on it if it is busy, then it will lock the inode for a file F. If it is a local server operation, the executing process will acquire the fas_lock and then lock the inode. If a DFS_CHNG_SYNC_MODE or a DFS_GET_ATTR RPC is sent from a server to a client, then the inode is unlocked before sending the RPC. Thus, the server can accept read and write operations after the RPC is sent. When the response messages from all the clients are received, the server locks the inode to finish any remaining local processing. If the operation was initiated at a client node, an acknowledgement is sent to that client. The inode is then unlocked and the fas_lock is released.

The fas_lock provides the means to synchronize the inode use and avoid deadlock operations. It minimizes the necessary software overhead that must be devoted to a distributed file system.

While the invention has been described in terms of a preferred embodiment in a specific operating system environment, those skilled in the art will recognize that the invention can be practiced, with modification, in other and different operating systems within the spirit and scope of the appended claims.

Having thus described our invention, what we claim as new and desire to secure by Letters Patent is set forth in the following claims:

We claim:

1. A method for locking at least one range of a file residing at a first node of a data processing system, said method comprising:

maintaining, in memory at said first node, information describing said at least one locked range of said file, said information used to service at least one locking request from at least one process located in at least one second node;

moving, from said first node, said information to reside in memory at one of said at least one second node when each of said at least one process resides at said one of said at least one second node; and servicing, at said one of said at least one second node, a subsequent lock request, performed by any process residing at the one of said at least one second node, using said moved information.

2. A method for locking at least one range of a file residing at a first node of a data processing system, said method comprising:

maintaining, in memory at said first node, information describing said at least one locked range of said file, said information used to service at least one locking request from at least one process located in at least one second node;

moving, from said first node, said information to reside in memory at one of said at least one second node when each of said at least one process resides at said one of said at least one second node;

servicing, at said one of said at least one second node, a subsequent lock request, performed by any process residing at the one of said at least one second node, using said moved information and;

moving, from said one of said at least one second node, said moved information to reside in memory at said first node when at least one operation performed at a different node than said one of said at least one second node requires the use of the information describing said at least one locked range of said file.

3. A method for locking at least one range of a file residing at a first node of a data processing system, said method comprising:

creating information that resides in memory at at least one second node and that describes said at least one locked range of said file, said information used to service at least one locking request from at least one process located in at least one second node; and servicing, at said one of said at least one second node, a subsequent lock request, performed by any process residing at the one of said at least one second node, using said information only when each of said at least one process resides at said one of said at least one second node.

4. A method for locking at least one range of a file residing at a first node of a data processing system, said method comprising:

creating information that resides in memory at at least one second node and that describes said at least one locked range of said file, said information used to service at least one locking request from at least one process located in said at least one second node;

servicing, at said at least one second node, a subsequent lock request, performed by any process residing at the one of said at least one second node, using said information when each of said at least one process resides at said one of said at least one second node; and storing, in memory at said first node, said information when at least one operation performed at a different node than said one of said at least one second node requires use of said information describing said at least one locked range of said file.

5. A system, in a data processing system, for locking at least one range of a file residing at a first node of said data processing system, said system comprising:

a data structure, at said first node, describing said at least one range of said file, said data structure being used to service at least one locking request from at least one process located in at least one second node;

means for moving, from said first node, said data structure to reside at one of said at least one second node when each of said at least one process resides at said one of said at least one second node; and means for servicing, at said one of said at least one second node, a subsequent lock request, performed by any process residing at the one of said at least one second node, using said moved data structure.

6. A system in a data processing system, for locking at least one range of a file residing at a first node of said data processing system, said system comprising:

a data structure, at said first node, describing said at least one locked range of said file, said data structure used to service at least one locking request from at least one process located in at least one second node;

first means for moving, from said first node, said data structure to reside at one of said at least one second node when each of said at least one process resides at said one of said at least one second node;

means for servicing, at said one of said at least one second node, a subsequent lock request, performed by any process residing at the one of said at least one second node, using said moved data structure; and second means for moving, from said one of said at least one second node, said moved data structure to said first node when at least one operation performed at a different node than said one of said at least one second node requires the use of the data structure describing said at least one locked range of said file.

7. A system, in a data processing system, for locking at least one range of a file residing at a first node of said data processing system, said system comprising:

a data structure, which resides at one of said at least one second node, describing said at least one locked range of said file, said data structure used to service at least one locking request from at least one process located in at least one second node; and means for servicing, at said one of said at least one second node, a subsequent lock request, performed by any process residing at the one of said at least one second node, using said data structure residing at said one of said at least one second node when each of said at least one process resides at said one of said at least one second node.

8. A system, in a data processing system, for locking at least one range of a file residing at a first node of said data processing system, said system comprising:

a data structure, which resides at one of said at least one second node, describing said at least one locked range of said file, said data structure used to service at least one locking request from at least one process located in at least one second node;

means for servicing, at said one of said at least one second node, a subsequent lock request, performed by any process residing at the one of said at least one second node, using said data structure when each of said at least one process resides at said one of said at least one second node; and means for storing, in said first node, said data structure when at least one operation performed at a different node than said one of said at least one second node requires the use of the data structure describing said at least one locked range of said file.

9. A method for locking a range of bytes of a file residing at a first node of a data processing system, said method comprising:

sending a message from a second node to the first node requesting a lock on the range of bytes of the file residing in storage at said first node;

sending notification from the first node to the second node that the lock is available; and releasing the lock at the first node when a confirmation of said sent notification is not received by said first node from said second node.

10. A system for locking a range of bytes of a file residing at a first node and accessible by processes located at a least one second node, said system comprising:

a first message from the second node to the first node requesting a lock;

means for sending notification from the fist node to the second node that the lock is available; and means for releasing the lock at the first node when a confirmation of said sent notification is not received by said first node from said second node.

11. A method for locking at least one range of a file residing at a first node of a data processing system, said method comprising:

intercepting, in one of a at least one second node, any file locking system operation that is being applied to said file from an application running in one of the at least one second node;

invoking a remote procedure call in said one of the at least one second node;

processing said remote procedure call in said first node;

returning to said one of the at least one second node information describing the state of the locks of the file; and using said information, which resides in memory of said one of the at least one second node, to perform said locking system operation in said one of the at least one second node.

12. The method of claim 11 further comprising the step of intercepting, in one of the at least one second node, at least one subsequent file locking system call that is being applied to said file from an application running in said one of the at least one second node, and using said information, which resides in said one of the at least one second node, to perform said at least one subsequent file locking system call in said one of the at least one second node.

13. A method of providing file locks in a distributed data processing system of the type having a plurality of nodes and a plurality of files physically residing at different ones of said nodes and a distributed file management system with a plurality of inodes comprising administrative information for each of said plurality of files and a plurality of surrogate inodes; said plurality of inodes including a server inode, at a server node, including access control means for a local file or a portion of said local file of said plurality of files and said plurality of surrogate inodes including a client surrogate inode, at a client node, corresponding to said server inode providing remote access control means for said local file, said remote access control means including locking means for locking said server inode to secure said local file or said portion of said local file, said method of providing file locks including:

unlocking said surrogate inode at said client node in response to said remote access control means locking said local file or said portion of said local file, sending a remote procedure call for obtaining a lock on said local file or said portion of said local file by means of said remote access control means from said client node to said server node subsequent to said step of unlocking said surrogate inode, and controlling the grant of a lock in response to said remote procedure call.

14. The method for locking said local files from a local node in a distributed data processing system as recited in claim 13 further including the steps of:

requesting an unlock of said local file from said server node; and unlocking said local file.

15. The method for locking said local files from a local node in a distributed data processing system as recited in claim 13 wherein said step of controlling the grant of a lock further includes locking said local file of said portion of said local file by means of said remote access control means, wherein said method further includes the step of:

locking said inode of said server node subsequent to said step of locking said local file of said portion of said local file by means of said remote access control means.

16. The method of providing file locks in a distributed data processing system as recited in claim 13 further including locking said local files from said server node including the steps of:

requesting a lock on said local file from said server node, and locking said local file by means of said remote access control means.

17. The method of providing file locks in a distributed data processing system as recited in claim 16, wherein said step of requesting a lock further includes intercepting a remote procedure call from said server node to said client node of said distributed data processing system, and transmitting said remote procedure call to said client node subsequent to said step of locking said local file by means of said remote access control means.

18. The method for locking said local files from a local node in a distributed data processing system as recited in claim 17, wherein said step of controlling the grant of a lock further includes locking said local file of said portion of said local file by means of said remote access control means, wherein said method further comprising the step of:

locking said inode of said server node subsequent to said step of locking said local file of said portion of said local file by means of said remote access control means.

* * * * *